US009100424B1

(12) United States Patent
Thomas

(10) Patent No.: US 9,100,424 B1
(45) Date of Patent: Aug. 4, 2015

(54) SYSTEM AND METHOD FOR SECURE REAL-TIME CLOUD SERVICES

(71) Applicant: Cogent Real-Time Systems Inc., Mississauga (CA)

(72) Inventor: Andrew S. Thomas, Mississauga (CA)

(73) Assignee: REAL INNOVATIONS INTERNATIONAL LLC, Georgetown (CA)

( * ) Notice: Subject to any disclaimer, the term of this patent is extended or adjusted under 35 U.S.C. 154(b) by 0 days.

(21) Appl. No.: 14/542,427

(22) Filed: Nov. 14, 2014

Related U.S. Application Data

(60) Provisional application No. 62/023,172, filed on Jul. 10, 2014, provisional application No. 62/035,473, filed on Aug. 10, 2014.

(51) Int. Cl.
*G06F 15/16* (2006.01)
*H04L 29/08* (2006.01)

(52) U.S. Cl.
CPC .............. *H04L 67/141* (2013.01); *H04L 67/02* (2013.01)

(58) Field of Classification Search
None
See application file for complete search history.

(56) References Cited

U.S. PATENT DOCUMENTS

| 6,625,643 | B1 * | 9/2003 | Colby et al. ................. 709/217 |
| 7,917,961 | B2 * | 3/2011 | McIsaac et al. ............... 726/28 |
| 8,181,238 | B2 * | 5/2012 | Holar et al. .................. 726/12 |
| 8,261,317 | B2 * | 9/2012 | Litvin et al. .................. 726/1 |
| 8,769,129 | B2 * | 7/2014 | Watsen et al. ............... 709/229 |
| 2002/0038371 | A1 * | 3/2002 | Spacey ......................... 709/227 |
| 2002/0095503 | A1 * | 7/2002 | Huang .......................... 709/227 |
| 2004/0267937 | A1 * | 12/2004 | Klemets ....................... 709/227 |
| 2009/0164635 | A1 * | 6/2009 | Denker et al. ............... 709/226 |
| 2011/0219123 | A1 * | 9/2011 | Yang et al. ................... 709/227 |

* cited by examiner

*Primary Examiner* — Brian P Whipple
(74) *Attorney, Agent, or Firm* — Fitzpatrick, Cella, Harper & Scinto

(57) ABSTRACT

A system and method for providing secure, end-to-end data service enabling real-time data over the Internet is disclosed. The system and method provides a communication framework between sensors, devices, and machinery and the users of that data from any remote location that is connected to the Internet without requiring open inbound firewall ports, while at the same time enabling high data rates, low latency and full bi-directionality. The graphical and networking features of RIA frameworks in combination with the disclosed system and method provide low-latency, real-time data applications in a web browser securely over the Internet.

16 Claims, 12 Drawing Sheets

SYSTEM AND METHOD FOR SECURE REAL-TIME CLOUD SERVICES

CROSS-REFERENCE TO RELATED APPLICATION

This application claims priority to U.S. Provisional Application No. 62/023,172, filed Jul. 10, 2014, and U.S. Provisional Application No. 62/035,473, filed Aug. 10, 2014, the contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

Real-time data refers to any digital or analog information that should be processed and/or transmitted within a certain amount of time after that data is originally created. The time elapsed from the moment that the data is created until it is processed and/or transmitted is known as latency. The maximum latency allowable for any particular real-time application is application-dependent. Applications where the maximum latency is a strict requirement can be referred to as "hard" real-time applications, while applications where the maximum latency is not a strict requirement can be referred to as "soft" real-time applications. Soft real-time applications need only satisfy an application-dependent, often subjective, measure of "fast enough". Non-real-time data is data that is not required to satisfy any particular latency requirement.

The term "data" may refer to hard real-time, soft real-time or non-real-time data. "Real-time data" may refer to hard real-time or soft real-time data.

Real-time data is typically generated due to a physical process or a computer program external to the computer system that processed the data. For example, real-time data may include: information from an industrial process control system such as motor status, fluid tank level, valve position, conveyor speed and so on; prices, volumes, etc. for financial instruments such as stocks; user interface events such as an indication that a user has clicked on a button on a computer display; data entry by a human operator; and computer operating system status changes. Virtually any information that is changing over time can be treated as real-time data.

An originator of data may be described as a "data source". For example, data may originate as a physical process, measured electrically, and converted to a digital representation, or data may originate in a digital representation. Generally, data is made available in a digital computer as a digital representation, following zero or more steps to convert the data into a digital representation. A data source may comprise all of the components and steps necessary to convert the data to a digital form accessible by a computer program.

Analogous to a data source is a "data sink". A data sink consumes, or uses, data. Some examples of data sinks are: actuators in a process control system; trade processing software in a stock trading system; a user interface application; a database or other data storage system.

Many data sources are also data sinks. Accordingly, a data source may comprise a data source, a data sink, or both simultaneously. For example, when data is transmitted to a data source, the data source may also act as a data sink.

In computer applications, data is commonly managed by a "server". The server can act as either a data source or a data sink, or both together, allowing "client" applications to interact with the data that the server manages.

Generally, a client application must initiate a connection with a server in order to interact with data. That connection can be "short-lived", where the connection exists only for the duration of a single or few interactions with the data, or "long-lived", where the connection persists for many interactions with the data, and possibly for the duration of the client application's lifetime. Long-lived connections are also referred to as "persistent" connections.

Data sources provide data in one or more "data formats" that define the digital representation of the data. The data format may conform to a published standard or be particular to the data source. Similarly, data sinks may require data in a published standard format or in a format particular to the data sink.

Data sources provide access to data through one or more "transmission protocols". A transmission protocol specifies the mechanism by which data are transferred from a data source to a data sink. A transmission protocol may conform to a published standard or be particular to the data source. A data source may combine data formats and transmission protocols such that not all supported data formats can be transmitted via all supported transmission protocols. Generally, a "protocol" or "data protocol" refers to the combination of a particular data format transmitted via a particular transmission protocol.

A data sink must support at least one data protocol offered by a data source in order to use the data generated by the data source. Since a large number of data protocols exist, it is impractical for all data sources and data sinks to support all data protocols. As a result, client applications that make use of data are usually created only to support the most necessary protocols for their primary purpose. Similarly, data sources generally support only those protocols that are necessary for their primary purpose. So, for example, there is no way to directly connect a web browser that supports the HTTP protocol to a spreadsheet application that supports the DDE protocol.

A protocol conversion step must be performed to convert data from a protocol supported by a data source into a protocol supported by a data sink in order for the data sink to make use of the data offered by the data source. This conversion step can be performed by a "middleware" application. A primary purpose of a middleware application may be to facilitate communication between a data source and a data sink, usually by converting data from one protocol to another such that data sources and data sinks can interact indirectly when they share no protocol in common.

A data source may transfer data to a data sink using at least two methods:

1. On demand: the data source passively waits for a data sink to request some or all of the data available in the data source. When the data sink makes a request for data, the source responds with a result indicating the current state of the requested data. If the data sink needs to be informed of changes to the data, the data sink must repeat the request in order for the data source to respond with the updated data. This repeated request for the same data by the data sink is known as "polling". A data sink may create either a short-lived connection to the data source for each new request, or a persistent connection over which many repeated requests are transmitted.

2. By subscription: the data sink creates a persistent connection to the data source, and subscribes to some or all of the data available from the data source. The data source transmits any changes to the data via the persistent connection as those changes occur. The data source will continue to send changes to the data until the data sink specifies otherwise or the connection is closed.

It is understood that data transfer methods such as shared memory, message queues and mailboxes are variations on either the demand or subscription methods. It is also understood that the terms data transfer, data propagation, or data transmission all refer to the movement of data within a system, and these terms may be used interchangeably, as they relate to the specific data transfer method. It is further understood that these methods are independent of the underlying transmission protocol.

Computer applications dealing with real-time data must be reliable, responsive and easily connected to their data sources. This has meant that real-time data processing applications have historically been created as stand-alone applications connected directly or indirectly to the data source. This stand-alone architecture has also allowed the applications to take full advantage of the graphical capabilities of the computer to provide rich dynamic visualization of the real-time data. By contrast, applications based on web browser technology have proven unsuitable in terms of data connectivity and graphical speed. The HTTP protocol is intended as a request-response communication method where each request-response pair requires a web client (typically a web browser) to open a new socket to a web server, perform the communication and then shut down the socket. This paradigm works well for communication that is infrequent and not particularly time-sensitive. The HTTP protocol further limits the types of transactions to data retrieval from the web server or data submission to the web server, but not both in the same transaction. Methodologies such as AJAX that are based on this model are expected to make relatively few transactions and tend to scale to higher speeds very poorly. The computational and networking costs of establishing and closing connections for each transaction act as a limit to the speed of such systems.

Consequently, widespread real-time data processing, as well as display in a web browser, has been unavailable. Some developer efforts have provided access to data-driven displays using ActiveX components in a web browser, but these components are generally poorly supported by modern browsers and subject to limitations due to the security risks that they represent.

Efforts have been made to display changing data in a web browser using the built-in Javascript engine of the browser. This is generally achieved using a methodology called AJAX (Asynchronous Javascript and XML), where the web browser polls periodically for new data and then updates its display accordingly. This polling mechanism is highly inefficient, and suitable only for relatively small data sets or for relatively slow-moving data. Lowering the polling rate to conserve CPU or network bandwidth has the effect of raising data latency, which is unacceptable for real-time applications.

Efforts to improve on AJAX, through a mechanism called Streaming AJAX, take advantage of a side-effect of the browser page loading mechanism to cause a browser page to grow incrementally by adding Javascript commands to the page over time. Each Javascript command executes as it arrives, giving the impression of a continuous data stream. The web browser is effectively fooled into thinking that it is loading a very large web page over a slow network connection. This method has several drawbacks, including the fact that the web browser's memory and CPU usage can grow continuously over time due to the ever-larger page that is being transmitted. Holding an HTTP connection open to collect multiple asynchronous messages from a specially designed web server like this effectively makes the short-lived HTTP connection into a long-lived streaming connection. This allows much faster updates from the server to the client, as new data can be transmitted from the server asynchronously and does not require the client to open and close a connection for each new message. However, it does nothing to speed up the communication from the client to the server. Effectively it creates a fast uni-directional channel from the server to the client, while still retaining the negative performance characteristics of HTTP when communicating from the client to the server.

Both AJAX and streaming AJAX methods suffer from a lack of quality display options within the web browser. Web browsers are generally designed for the display of static pages and web "forms", and do not offer high-speed or high quality graphic presentation options. Efforts to improve upon graphical display options have tended to be incompatible among web browsers, and generally very slow to execute.

All data transmission solutions based on built-in web browser capability are primarily targeted at receiving data in the web browser. The communication of data is uni-directional, in that the connection that receives data from a server cannot also be used to transmit data to the server. If the web browser needs to transmit data back to the server, it must do so by opening a new connection, transmitting an HTTP request, and then closing the connection again. Consequently, solutions such as Streaming AJAX are very slow to transmit data back to the data server, because of the large overheads and latencies incurred by having to emit a new HTTP request for every data transmission.

Some efforts at web-based data visualization attempt to improve the user experience by presenting slow-moving (high latency) data as if it were faster. This is achieved by displaying interpolated data in the web browser at higher frequency than the data is actually arriving. For example, a circular gauge representing a speedometer might receive the values 1 and 100, separated in time by 5 seconds. The web page could then draw the gauge dial 5 times per second, changing the value by 4 each time. This would give the viewer an impression of a smoothly changing speed, even though the underlying data delivery contains no such information. That is, such a display of interpolated data can be entirely misleading to the viewer. This kind of interpolation obscures the true behavior of the underlying data, and is usually unacceptable in real-time applications such as process control and stock-market trading.

Rich Internet Application ("RIA") frameworks such as Adobe Flash™ and Microsoft Silverlight™ offer improved platforms for both data processing and graphical display within a web browser. These RIA frameworks also support direct TCP/IP communications within the RIA. Surprisingly, the combination of these features makes it possible to process and display real-time information in a web browser. This processing and display capability has not been translated into real-time data systems due to a perception in the software industry that RIAs are suited primarily to video, advertising and games.

A common alternative to HTTP is to provide a secondary communication socket for high-speed data alongside the HTTP communication channel. Effectively, the web client communicates via HTTP for the presentation information, and via a separate dedicated socket for high-speed bi-directional data communication. This solves the speed issue, but introduces other issues:

A separate communication socket requires a separate TCP port to be open on the server. This means another opening in the corporate firewall, which IT departments commonly resist.

Rich Internet Application (RIA) frameworks, such as Flash or Silverlight, commonly implement limits on socket communication that require yet another well-known port to be open to act as an access policy server. This introduces a further opening in the corporate firewall, further limiting the usefulness of the technique.

An RIA framework operating within a browser (e.g., Silverlight) may not implement its own SSL layer, relying instead on the browser's HTTPS implementation for encryption. In such a case, a dedicated socket implemented by an RIA will not be secure.

Dedicated sockets will not pass through web proxies.

The advent of high-speed or real-time data processing over the Internet has created a need for long-lived high-speed socket communication. This need has driven the RIA implementers to offer such sockets, but with the limitations described above. There remains an unmet need for long-lived bi-directional socket communication over HTTP or, more preferably, HTTPS to a web server.

The HTML5 specification includes a draft specification called WebSockets. This intends to provide two-way communication between a client and server using a HTTP-mediated socket. Although WebSockets are not universally supported at this time, they provide the possibility of creating bi-directional connections through forward and reverse web proxies. The current invention enables real-time data connectivity through WebSockets, providing successful connectivity even in instances where the data source or end user are isolated from the Internet via proxy servers and are unable to make a connection via an arbitrary TCP/IP port. This significantly broadens the set of network topologies on which the current invention may be usefully implemented while allowing an additional potential level of security on the client networks.

The present invention is suitable to augment industrial Supervisory Control And Data Acquisition ("SCADA") systems. SCADA systems comprise data collection hardware such as sensors and other devices, communication networks, central processing systems, and display units to allow plant operators and engineers to view the data in their industrial processes in real time. SCADA systems often comprise interfaces that support a supervisory level of coordination and control, such as uploading new recipes to a candy-making machine, changing global settings on a wind turbine, or acknowledging a high pressure alarm for a boiler.

SCADA systems have evolved over time. The first generation systems were "monolithic", running on individual computers, connecting to field devices directly. The second generation allowed "distributed" processing, using multiple computers communicating with each other over a local-area network ("LAN") and communicating with the field devices over proprietary control networks. The current, "networked", generation uses personal computers and open standards such as TCP/IP and open protocols for local-area networking. Thus it is now possible to access SCADA systems and data from the Internet, although there are fundamental questions about security that are limiting the broad adoption of such capabilities.

Networked SCADA systems are designed using a client/server model. A server (device or software application) contains a collection of data items. These data items are made available to a client (device or software application) upon request by the client. The implicit assumption is that the server is the authoritative source of the data values, and has a-priori knowledge of which data values it will supply. The client is non-authoritative, and determines which data items it may use by querying the server. For clarity, the authoritative source of data has the responsibility to determine which data items it will contain and make available to its clients, and the data values held in the authoritative source are presumed to be correct and current. The client cannot determine which data items exist, and may only affect the values and/or properties of the data items defined within the server.

Importantly, the server is simultaneously the authoritative data source and also a listener for incoming connections from the client. In a networked system, this means that any client that uses the data must be able to initiate a connection to the server. In a SCADA system, this would mean, for example, that an operator workstation (acting as a client) must be able to make a connection to the SCADA server. This in turn requires that the SCADA server be reachable via the network from the client's location. In the case of a Internet-based or cloud-based system, this means that the SCADA server must be reachable from the Internet, posing an unacceptable security risk. For clarity, the terms "cloud" and "Internet" may be used interchangeably throughout this disclosure.

When the topic of cloud computing is raised among process control engineers, there are many justifiable concerns about security. SCADA and other manufacturing and control systems often support high-value production lines, where any interference or foul play could cost thousands or millions of dollars. Although recently some shop floors have begun to make their process data available to the rest of the company on corporate LANs, there is strong resistance to opening ports in plant firewalls to allow incoming connections from the Internet.

On the other hand, cloud systems generally require Internet access, typically using a web browser HMI ("Human Machine Interface") or RIA or other kind of client to connect to a server on the process side. Until the present invention, this meant that a port had to be opened in the factory firewall to allow the web browser to connect. And this is a security risk that few plant engineers are willing to take. The primary source of security exploits is firewalls permitting inbound connections. Unless these are removed, the plant is exposed to attack.

Due to the mission-critical nature of SCADA systems, engineers and managers responsible for industrial processes are reluctant to expose them directly to the Internet, running behind secure firewalls to keep intruders and hackers at bay. Compounding the problem is that the architecture of most installed industrial systems was not developed with the Internet in mind. To adequately address the concerns of industrial users, a fundamentally different approach to data networking is needed. The present invention solves this problem by employing a novel approach to security that meets the stringent requirements of industrial users of real-time data.

SUMMARY OF THE INVENTION

The present invention provides a system and method for use of the graphical and networking features of network clients such as web browsers, RIA frameworks and dedicated applications in conjunction with at least one real-time data server to provide low-latency, real-time data applications in a web browser. The invention overcomes the limitations of current AJAX and streaming AJAX while simultaneously dealing with data sources whose data is not usable within a web browser.

The present invention also provides a long-lived, bi-directional communication mechanism from a web client that may be performed entirely over HTTP or HTTPS, preferably using existing HTTP verbs (e.g. GET and POST) while being operable with existing browser and RIA technology. Throughout this disclosure, the terms "RIA", "Rich Internet Application", "Web Browser", "network client" and "client" are understood to refer interchangeably to any software or hardware application that communicates by means of the HTTP or HTTPS protocol.

The present invention also provides a system and method for secure, end-to-end data service enabling real-time data over the Internet. The invention provides real-time connectivity between sensors, devices, and machinery and the users of their data from any remote location that is connected to the Internet, with data throughput rates that may be over 25,000 data changes per second, preferably over 50,000 data changes per second, more preferably over 75,000 data changes per second, and most preferably over 100,000 data changes per second. The added latency of the data stream may be measured in milliseconds more than the latency of the connection over the Internet itself, preferably no more than 200 milliseconds, more preferably no more than 100 milliseconds, yet more preferably no more than 50 milliseconds, yet more preferably no more than 25 milliseconds, yet more preferably no more than 10 milliseconds, and most preferably no more than 5 milliseconds. The present invention is particularly valuable for those working with real-time data from industrial systems, embedded devices, "smart" devices or financial systems.

The invention improves upon the state of the art in real-time data delivery to web browsers and network clients by reducing the data latency to a point where visualization components can be animated using true data values, rather than interpolated values. This allows short-lived behavior in the data to be more accurately presented to the user. Short-lived data behavior is commonly important in understanding the true dynamics of the real-time system represented by that data. For example, a person watching a physical gauge can discern important system properties by watching vibration or overshoot in the gauge needle behavior. In one embodiment of the invention, a digital representation of the physical gauge can capture the needle dynamics and provide the same high-quality information as the physical gauge.

The invention vastly improves the speed of data transmission from the user to the data server, reducing CPU and network costs and reducing latency. This allows the user to participate in more sophisticated control scenarios where system responsiveness is important to correct behavior. For example, the system may require a hold-and-release interaction while filling a vessel with water. The user would press a button and hold it until the vessel is full, then release the button. Clearly, the system must respond rapidly in order to avoid over-filling the vessel. This type of control is not possible in typical web-based applications due to the unpredictability of the data delivery latency. Surprisingly, the invention makes possible classes of control and real-time data applications that were previously too slow, unreliable or primitive to be contemplated through a web browser.

Typical web applications deal with data provided in a specific format by the application designer. This may be an intentional method for limiting the end-user choice, or simply a limitation on the design. Even where the data format follows an industry standard (such as XML or JSON), the data source is specific to the application. The invention also provides a general purpose mechanism for delivering a wide variety of real-time data originating from both industry-standard and proprietary sources. Advantageously, the invention can further provide that data in a variety of data formats.

Many sources of data, both real-time and non-real-time, are not intended for network use (i.e., transmission over a network). The present invention allows data from these data sources, such as Microsoft Excel™ (Microsoft Corp.), to be reliably and rapidly delivered to any RIA or web-based application over a network. Some data sources, such as those based on OPC, were intended for network use but are not designed for communication with a web browser. The invention allows these sources to also be delivered reliably and rapidly to a web-based application. Other data sources, such as database systems, provide no interface at all for real-time information. The invention allows non-real-time data from sources such as database applications to be delivered as if it were real-time, thereby eliminating the need for a RIA or web-based application to perform very inefficient polling of the database.

Data sources and data sinks may connect to the server via persistent connections or short-lived connections. It is understood that the connection method to the server will reflect the requirements of the particular data source or sink.

The invention provides a method by which real-time data from one or more data sources is efficiently made available to a Rich Internet Application. The invention further provides a method for the RIA to efficiently modify the real-time data or generate new real-time data that can be transmitted back to the data source or sources. The data source or sources can then retransmit that data to other RIAs on the network. The invention thus effectively allows any number of RIA applications to communicate with one another in real time, and to jointly communicate with one or many real-time data sources. The invention allows for the abstraction of real-time data such that any data that can be represented using the abstraction can be made available to the RIA, regardless of its original source, representation or transfer protocol.

The present invention provides a system and method for an Internet or cloud-based communication framework and service that does not require any open incoming firewall ports for connected data sources and clients (e.g. industrial facilities, end-user client devices), thereby eliminating exposure to potential attacks. The invention provides this novel improvement by reversing the client/server relationship between the plant and the cloud server. Instead of the plant data source acting as a server, with the present invention, the plant data source acts as a client, and the cloud service acts as the server. This reverses the direction of how a connection is made with the Internet. The plant data source server sends an outbound connection request to a server in the cloud, and therefore there is no need to open any inbound ports in the plant firewall. This novel approach keeps the plant firewall closed, and shrinks the potential attack surface to zero.

Prior to the present invention, reversal of the client/server relationship was not done before because there was no perceived need, and it did not make intuitive or architectural sense. Existing SCADA and control systems, as well as standard industrial protocols, such as OPC, expect the server to be an authoritative holder of a data set. Since the data is being generated at a process, and then used elsewhere, it is logical that consumers of the data (e.g. outside users) are the clients, and that the clients request data from the process, the server. A client is naturally expected to connect to the server, query the data set, and subscribe to the data that the client requires. This prior art method works well enough in a closed system that existing protocols were designed for. However, a cloud-based system requires a fundamentally new approach.

By changing the role of client and server, the present invention provides the unusual and novel case where the client becomes the authoritative holder of the data set. The process, acting as a client, connects to the cloud server and configures that server with its current data set. Updates to the data set are subsequently passed from the process to the cloud server. On the other side, users (clients) of the data connect to the cloud server by a similar method. Clients also make outbound client connections to the cloud server, and can interact with the data set in real time. On the client side as well, no incoming firewall ports need be opened. Functioning in this manner, the present invention allows a cloud server to provide access to process data without opening a single incoming port in the plant firewall or in the client's firewall.

The current invention inverts the client/server relationship. That is, the client application can optionally act as the authoritative data source, and the server can act as a non-authoritative consumer of that data. In fact, the current invention provides for a single application to act as an authoritative server, an authoritative client, a non-authoritative server and a non-authoritative client simultaneously. This makes it possible to situate a server application on a publicly accessible cloud computer that is acting as a non-authoritative server, while configuring a SCADA system within a secure network as an authoritative client. The SCADA system makes an outbound connection from within the secure SCADA network to the cloud server, and populates the cloud server with its data set. The cloud server requires no a-priori knowledge of its data set, but instead learns its data set from the authoritative client in the SCADA system. Other clients on the public network that need access to the SCADA system's data will connect to the cloud server as non-authoritative clients, thus treating the cloud server as an authoritative server for the data that in fact originates at the SCADA system. Thus, a client application is able to connect to the cloud system and interact with the SCADA system's data as if it were connecting to the SCADA system, yet the SCADA system is never exposed to the public network. An unexpected result of the present invention is to provide remote access to the SCADA system's data without compromising the network security of the SCADA system itself.

For added security, the current invention allows for a second instance of the application, operating as a non-authoritative server to the SCADA system and as an authoritative client to the cloud system, to be installed in a separate network within the industrial plant such that this second instance has no access to the secure SCADA network. The SCADA system then emits data to this second instance, and this second instance emits the data to the cloud server. In this configuration, the SCADA system does not even have a direct outbound connection to the Internet, but instead is further isolated by the network containing the second instance.

SCADA systems generally provide a mechanism to allow a client application (like an operator panel) to emit value changes to certain data items. For example, an operator may want to start or stop a machine in the plant. Plant owners may be reluctant to allow modifications to the SCADA data from remote locations. The current invention allows the SCADA system (acting as an authoritative client to the cloud) to refuse all attempts to modify the values of data items, even where user permissions would normally allow it. In addition, the cloud server can be configured to allow certain users to modify the values of certain data items based on their user credentials and the IP address of the computer from which they are connecting. Thus, the current invention provides security both from attacks via the public network and from unauthorized attempts to modify the data, even in the event that the cloud server is compromised.

In another embodiment, a method of providing a secure network connection is performed by listening at a server for inbound connection requests to the server on a network between the server and a client, receiving at the server a first inbound connection request from the client, establishing from the first inbound connection request a first network connection between the server and the client, and receiving at the server a first data set from the client over the first network connection, wherein the client is the authoritative source of the first data set and is inaccessible via inbound connection requests.

In another embodiment, a system for providing a secure data network is provided. The system includes a server communicatively coupled to a network between the server and a client, the server operable to: listen for inbound connection requests, establish a first data connection between the server and the client based on a first inbound connection request received by the server, and receive a first data set from the client over the first data connection, wherein the first data set is produced by an authoritative source. The client is inaccessible via inbound connection requests and the client is the authoritative source.

Although this description refers to its application to SCADA systems, it should be understood that this same mechanism is broadly applicable for any data that may be made available via a public network. That data could originate from any program or process, such as financial trading systems, home electricity meters, remote machinery, cell phones, embedded devices, or any other program or device that generates data, and still fall within the scope of the present invention. In one aspect of the invention, a common requirement is that the data source is not be required to accept inbound network connections in order to make its data available to users of that data.

DETAILED DESCRIPTION OF THE INVENTION

Figure 1:
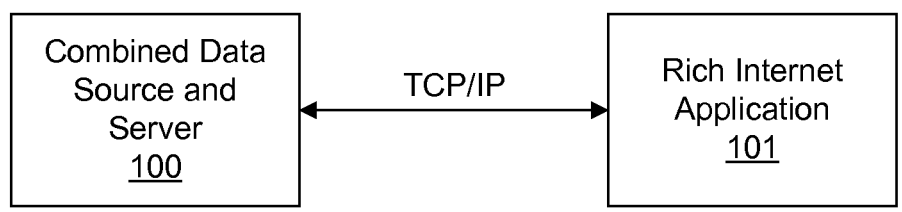
FIG. 1 is an exemplary block diagram illustrating a direct connection between a RIA and a data server, in accordance with one embodiment of the present invention.

The following description is presented to enable any person skilled in the art to make and use the invention, and is provided in the context of particular applications of the invention. Various modifications to the disclosed embodiments will be readily apparent to those skilled in the art, and the general principles defined herein may be applied to other embodiments and applications without departing from the scope of the present invention. Reference to various embodiments and examples does not limit the scope of the invention, which is limited only by the scope of the claims attached hereto. Additionally, any examples set forth in this specification are not intended to be limiting and merely set forth some of the many possible embodiments for the claimed invention.

The program environment in which a present embodiment of the invention is executed illustratively incorporates a general-purpose computer or a special purpose device such as a hand-held computer, telephone or PLC. Details of such devices (e.g., processor, memory, data storage, display) may be omitted for the sake of clarity.

It is also understood that the techniques of the present invention may be implemented using a variety of technologies. For example, the methods described herein may be implemented in software executing on a computer system, or implemented in hardware utilizing either a combination of microprocessors or other specially designed application-specific integrated circuits, programmable logic devices, or various combinations thereof. In particular, the methods described herein may be implemented by a series of computer-executable instructions residing on a suitable computer-readable medium. Suitable computer-readable media may include volatile (e.g., RAM) and/or non-volatile (e.g., ROM, disk) memory, carrier waves and transmission media (e.g., copper wire, coaxial cable, fiber optic media). Exemplary carrier waves may take the form of electrical, electromagnetic or optical signals conveying digital data streams along a local network, a publicly accessible network such as the Internet or some other communication link.

In reference to the example embodiments shown in the figures, it is understood that simplified examples were chosen for clarity. Single instances of an element (e.g. a RIA, a server, a client, a data source, a data sink, etc.) appearing in the figures may be substituted for a plurality of the same element, and still fall within the scope of the present invention.

Accordingly, in one aspect, the present invention provides a method of providing real-time data to a RIA, the method comprising: producing data at a data source; propagating the data to a server; collecting the data at the server; creating a persistent connection from the RIA to the server; and subscribing the RIA to subscribed data, wherein the subscribed data comprises at least some of the data collected at the server, wherein the server propagates the subscribed data to the RIA through the persistent connection as the data is collected at the server. The method may further comprise sending RIA-originated data to the server. The RIA-originated data may contain at least one change request to the data or at least one command to the server through the persistent connection. Further, the data may be propagated through at least one intermediate component. The server may receive the at least one change request and transmit the at least one change request to the data source. The at least one change request may be transmitted through the intermediate component. The intermediate component may be an intermediate hardware component or an intermediate software component. Optionally, the RIA may subscribe to the subscribed data. Producing data at the data source and propagating the data to the server may be concurrent with collecting the data at the server. The RIA may perform an action based upon the data, such as a calculation or a modification of a graphical representation. The RIA may provide a visual representation of the data on a user display, and a user may interact with the visual representation to generate RIA-originated data. The visual representation may be a program running within a RIA framework. The RIA-originated data may instruct the server to perform an action, such as to shut down the server, or to alter its behavior, such as to alter which data arrives from the server.

For example, RIA-originated data may be as a result of user interaction, a timer event, a response to a data change coming from the server, a script, or another non-user generated event.

In another aspect, the present invention provides a method of providing real-time data to a RIA, the method comprising: providing data from a data source; propagating data from the data source to a server; collecting data at the server; producing data at the RIA; creating a first persistent connection from the server to the RIA; creating a second persistent connection from the RIA to the server; propagating data from the RIA to the server through the second persistent connection; and subscribing the RIA to subscribed data, wherein the subscribed data comprises at least some of the data collected at the server, and wherein the server propagates the subscribed data to the RIA through the first persistent connection. The method may further comprise propagating data from the server to a data sink. The first persistent connection and the second persistent connection may consist of a single connection. The data source, data sink and server may consist of a single component, or any combination of two or more components. The data may be propagated though at least one intermediate selected from the group comprising: a software component, a hardware component, and a network.

A data item may be propagated between the RIA and the server on a subscription basis, wherein the data item is propagated immediately in response to a change in the data item. The propagated data may be selected from the group comprising: numeric data, non-numeric data, configuration settings and executable commands. The RIA may perform an action based upon the data, where the action is selected from the group comprising: a modification of a visual representation of a user display, a calculation, production of new data, modification of existing data, storage of data, an audible indication, execution of a script, propagation of data to the server, a user-visible programmatic response, and a non-user-visible programmatic response. Data produced at the RIA may instruct the server to perform an action selected from the group comprising: modification of data within the server, propagation of the data to data sinks connected to the server, execution of a script, storage of the data to a file system, creation of new data, propagation of new data to data sinks connected to the server, modification of a server configuration, modification of a server behavior, a user-visible programmatic response, and a non-user-visible programmatic response.

In yet another aspect, the present invention provides a computer readable storage medium storing instructions that, when executed on one or more computers, cause the computers to perform methods of providing real-time data to a RIA as described above.

In another aspect, the present invention provides a system for providing real-time data to a RIA, the system comprising: at least one data source; at least one server comprising: a data collection component for collecting data from the at least one data source; and a data emission component for emitting data to at least one data client; at least one RIA; and optionally at least one data sink. The server may further comprise a data modification component for modifying the form of the data collected by the data collection component for emission by the data emission component. It is understood that the at least one data source and at least one server may be implemented in at least one computer program (i.e. a single computer program, or two or more separate computer programs).

The server may further comprise one or more components selected from: a data modification component; a data creation component; a user interface component; a computer file system interaction component; a program interaction component for interacting with other programs running on a computer running the server; a scripting language component to perform programmable actions; an HTTP component for accepting HTTP requests from client programs and respond with documents as specified by those requests, in a manner analogous to a "web server", including the ability to dynamically construct the document in response to the request, and to include within the document the current values of the data resident in the server and the results of executing statements in the server's built-in scripting language; a synchronization component to exchange and synchronize data with another running instance of the server on any local or network-accessible computer, such that both servers maintain essentially identical copies of that data, thereby enabling client applications connected to either instance of the server to interact with the same data set; a first throttling component to limit the rate at which data is collected; a second throttling component to limit the rate at which data is emitted; a connectivity component to detect a loss of connectivity to other servers, and to reconnect to the other servers when connectivity is regained; a redundancy component to redundantly connect to multiple other servers of identical or similar information such that data from any of the other servers may be collected in the event that one or more of the other servers is inaccessible; and a bridging component to "bridge" data among sources of data such that some or all of the data within those sources will maintain similar values with one another, or bridge data among data sources including a mathematical transformation such that the data in one source is maintained as the mathematical transformation of the data in the other source, including the ability to apply the mathematical transformation in both the forward and inverse directions through a bi-direction bridging operation. It is understood that this set of server components could be extended by adding additional functionality to the server to support other data collection and transmission mechanisms, other processing mechanisms and other storage mechanisms.

The data collection component may collect data in one or more of the following manners: on demand, wherein the server sends a request for some or all of the data resident in another server, and that other server responds with the current value or values of the requested data only once in response to the request; by subscription, wherein the server sends a request for a subscription to some or all of the data resident in another server, and the other server responds by sending the current value or values of its data, and then continues to send any subsequent changes to the value or values of the data until the server either terminates its connection to the other server, or requests that the other server cease sending updates; on a trigger, wherein a client, script or human (a "user") configures the server to collect the data only if a certain trigger condition is met, be that a timer, a time of day, a data change, a change in the system status, a user action or some other detectable event; and passively by waiting for a "client" application to send data to the server.

The data emission component may emit data in one or more of the following manners: on demand, wherein a "client" application sends a request for some or all of the data, and the server responds with the current value or values of the requested data only once in response to the request; by subscription, wherein a client application sends a request for a subscription to some or all of the data, and the server responds by sending the current value or values of the data, and then continues to send any subsequent changes to the value or values of the data until the client either terminates its connection to the server, or requests that the server cease sending updates; and on a trigger, wherein a client, script or human (a "user") configures the server to emit the data only if a certain trigger condition is met, be that a timer, a time of day, a data change, a change in the system status, a user action or some other detectable event.

The data collected at the data collection component may be received using one or more transmission protocols selected from: Dynamic Data Exchange (DDE), OLE for Process Control (OPC), OPC Alarm and Event specification (OPC A&E), OPC Unified Architecture (OPC-UA), OPC Express Interface (OPC-Xi), TCP/IP, SSL (Secure Socket Layer) over TCP/IP through a custom interface, Hypertext Transfer Protocol (HTTP), Secure HTTP (HTTPS), Open Database Connectivity (ODBC), Microsoft Real-Time Data specification (RTD), Message queues, Windows Communication Foundation (WCF), industrial bus protocols such as Profibus and Modbus, Windows System Performance Counters, TCP/IP communication from embedded systems, TCP/IP communication from non-MS-Windows systems, TCP/IP communication from Linux, TCP/IP communication from QNX, TCP/IP communication from TRON, TCP/IP communication from any system offering a C compiler and TCP implementation, Scripts written using a built-in scripting language, data entered by humans through a user interface, data read from a local disk file, data read from a remotely accessible disk file, proprietary formats, user-defined formats, and formats added through extensions to the server. An example of a proprietary format is Wonderware SuiteLink™.

The data emitted from the data emission component may be transmitted using one or more transmission protocols selected from: Dynamic Data Exchange (DDE), OLE for Process Control (OPC), OPC Alarm and Event specification (OPC A&E), OPC Unified Architecture (OPC-UA), OPC Express Interface (OPC-Xi), TCP/IP, SSL (Secure Socket Layer) over TCP/IP through a custom interface, Hypertext Transfer Protocol (HTTP), Secure HTTP (HTTPS), Open Database Connectivity (ODBC), Microsoft Real-Time Data specification (RTD), Message queues, Windows Communication Foundation (WCF), industrial bus protocols such as Profibus and Modbus, TCP/IP communication to embedded systems, TCP/IP communication to non-MS-Windows systems, data presented to humans through a user interface, data written to a local disk file, data written to a remotely accessible disk file, proprietary formats, user-defined formats, formats added through extensions to the server, electronic mail (E-Mail), and Short Message Service (SMS) message format.

Further, the data collected at the data collection component may be in a format appropriate to the transmission protocol. The data emitted from the data emission component may be in a format appropriate to the transmission protocol. The data collected at the data collection component and the data emitted from the data emission component may also be in a format selected from: parenthetical expression (LISP-like) format, Hypertext Markup Language (HTML), eXtensible Markup Language (XML), JavaScript Object Notation (JSON), proprietary binary format, user-definable text format, and a format added through extension of the server.

The system may further comprise an Application Programming Interface (API) that implements a TCP/IP connection and one or more of the data formats supported by the server, which may assist a programmer in establishing a connection as described above. The API may be implemented for one or more of the following platforms: "C" programming language, "C++" programming language, Microsoft .Net programming environment, Microsoft Silverlight RIA framework, Adobe Flash RIA framework, Adobe Air RIA framework, a programming language supporting TCP/IP communication (including any scripting language), and a RIA framework supporting TCP/IP communication.

The RIA may be implemented using a RIA framework selected from: Microsoft Silverlight, Adobe Air, and a RIA framework supporting TCP/IP communication. The RIA framework may comprise support for: making a first long-lived TCP/IP data connection to the server to receive data; receiving data from the server; and transmitting data to the server over a second TCP/IP data connection. The data may be received from the server on demand or by subscription. The first TCP/IP data connection and the second TCP/IP data connection may be the same connection. The second TCP/IP data connection may be a long-lived connection. The second TCP/IP data connection may be a short-lived connection. The TCP/IP data connection to the server may be in a protocol selected from: an API, as described above, a direct TCP/IP connection, HTTP and HTTPS.

The client may be implemented using a RIA framework, a web browser, a compiled computer language, an interpreted computer language, a hardware device, or another implementation mechanism that supports the HTTP and/or HTTPS protocols. The client may comprise support for: making a first long-lived TCP/IP data connection to the server to receive data; receiving data from the server; and transmitting data to the server over a second long-lived TCP/IP data connection. The data may be received from the server on demand or by subscription. The TCP/IP data connections to the server may be in a protocol selected from: HTTP and HTTPS.

Data from the server may be received, or data to the server may be transmitted, in one or more forms selected from: a parenthetical expression (LISP-like) format, Hypertext Markup Language (HTML), eXtensible Markup Language (XML), JavaScript Object Notation (JSON), a proprietary binary format, a user definable format, and a format added by extension to the server.

The RIA framework may further comprise support for presenting a graphical display representing the data to a user. The graphical display may comprise one or more graphical elements selected from: a textual display, a slider, a chart, a trend graph, a circular gauge, a linear gauge, a button, a check box, a radio button, a progress bar, a primitive graphical object, controls supported by the RIA framework, custom controls created to extend the RIA framework, third-party controls implemented using the RIA framework, and a customized graphical element.

Configuration information of the graphical display may be saved on the server, as well as loaded from the server. A graphical element may be created and modified within the graphical display. The graphical element may be a customized graphical element, customizable by a user, wherein the customization may be saved on the server. Customization may be performed by a programmer, without requiring modification to an application implemented in the RIA framework. The customized graphical element may be available for use to a user in other graphical displays. These customizations may be for creating new displays, modifying existing displays, all in addition to the graphical elements originally supported by the user interface application. The graphical element may comprise one or more properties that are user-modifiable, and which may be selectable by a programmer. User interaction with the graphical element may cause a user interface application to emit modifications to the data to the server. A user-only mode may be provided to disallow creation or modification of the graphical display by a user, and a read-only mode may also be provided to disallow interaction with the graphical element by the user. A system administrator may select which user and for which graphical display a user interface application will operate in one of the user-only mode and read-only mode. The user may be required to identify himself, and where such identification is required, the user interface application may operate in at least one of the user-only mode and the read-only mode. Advantageously, the features of the invention allow modification of the graphical displays through any user RIA terminal and the resulting changes, upon saving, are immediately available to all other RIA terminals connected to the server.

In another aspect, the present invention provides a method of providing bi-directional streaming communication over the HTTP or HTTPS protocol between a client and a server, the method comprising: generating a session ID; opening a first socket via a first HTTP transaction from the client to the server; associating the session ID with the first socket at the server and client; opening a second socket via a second HTTP transaction from the client to the server; associating the session ID with the second socket at the server and at the client; maintaining a long-lived connection on the first socket; and maintaining a long-lived connection on the second socket, wherein a correspondence is created among the session ID, the first socket and the second socket, and wherein bi-directional communication is established between the client and the server.

The method may further comprise the client transmitting at least one data message selected from the group comprising: configuration information, commands, real-time information, pending data from a previous transaction, and other data. The method may further comprise waiting for an event from the first socket; verifying whether the event from the first socket is an error; reading available data from the first socket when the event is not an error; processing the data to produce a result; and optionally sending the result to the server via the second socket. The method may further comprise the client: closing the first socket; and closing the second socket, wherein the event from the first socket is an error. The method may further comprise the client: waiting for a client-generated event; processing the client-generated event to produce a result; and optionally sending the result to the server via the second socket. The client-generated event may be selected from the group comprising: an internally-generated stimulus, a result of user activity, a timer, and an external stimulus. The method may further comprise the client: marking data for transmission to the server as pending; closing the second socket; opening a new second socket; and associating the new second socket with the session ID.

The method may further comprise the server: waiting for an event from the second socket; verifying whether the event from the second socket is an error; reading available data from the second socket when the event is not an error; processing the data to produce a result; and optionally sending the result to the client via the first socket. The method may further comprise the server closing the second socket, wherein the event from the second socket is an error. The method may further comprise the server: waiting for a server-generated event; processing the server-generated event to produce a result; and optionally sending the result to the client via the first socket. The server-generated event may be selected from the group comprising: an internally-generated stimulus, a result of user activity, a timer, a result from another connected client, data from a data source, and an external stimulus. The method may further comprise the server: closing the first socket; and closing the second socket.

In the above method, the first HTTP transaction may be selected from the group comprising: a HTTP GET transaction and a HTTP HEAD transaction; and the second HTTP transaction may be selected from the group comprising: a HTTP POST transaction, a HTTP PUT transaction, a HTTP PATCH transaction, and a HTTP TRACE transaction. Preferably, the first HTTP transaction is a HTTP GET transaction, and the second HTTP transaction is a HTTP POST transaction.

In yet another aspect, the present invention provides a system for providing bi-directional streaming communication over the HTTP or HTTPS protocol, the system comprising: at least one client; and at least one server, wherein the at least one client is adapted to implement the above-described method, and wherein the at least one server is adapted to implement the above-described method. The at least one client may comprise a RIA. The at least one server may comprises: a data collection component for collecting data from the at least one data source; and a data emission component for emitting data to at least one data client.

In yet a further aspect, the present invention provides a computer readable memory storing instructions that, when executed on one or more computers, cause the computers to perform a method of providing bi-directional streaming communication over the HTTP or HTTPS protocol between a client and a server, the method comprising the steps of the above-described method.

As described above, the HTTP protocol implements a transaction model where each transaction is generally short-lived. Each transaction is initiated by the client, and is specified to either transmit data to the server, or to request data from the server, but not both.

A web client may need to transmit or receive a large volume of data. In this case, it may implement an API that allows the client to send-and-receive the data in incomplete chunks. That is, it may require multiple send and receive actions before the entire data set has been transmitted. For example, a client that receives an image from a server may receive the image in chunks of 1 KB so that it can begin to render the image before the entire image has arrived to produce a progressive rendering effect. This behavior can be leveraged within the client to produce a continuous stream of data. The client may make an HTTP GET request to a URL on a specially designed server (or a standard server with a specially designed handler for that URL). The server may respond with an HTTP header, and then hold the socket open. At any time in the future, the server may transmit data on the socket, which will arrive at the client as an incomplete transmission. The client can process this data and then wait for more. So long as the server holds the socket open, the client will simply act on the expectation that there is more data to be received, and will process it as it arrives. The server can transmit more information asynchronously to the client at any time without the need for the client to repeatedly open and close HTTP connections. This mechanism is the underlying methodology of Streaming AJAX. As disclosed above, it is uni-directional. This mechanism does not provide high-speed communication from the client to the server.

One of the important innovations of the present invention is to solve the problem of creating a high-speed connection from the client to the server. The solution provides that the client opens an HTTP POST transaction with the server, and transmits the necessary HTTP header information. The server will then wait for the data payload of the POST to arrive. At any time in the future, the client may transmit data on the open socket, effectively acting like the Streaming AJAX mechanism in the reverse direction. The client may hold the socket open indefinitely, transmitting data as necessary without having to repeatedly open and close HTTP connections for each new transmission.

The server must be aware that the data will arrive as a stream, and to process the information as it arrives. This may require custom behavior in the server.

The HTTP protocol specifies that a client must inform the server of the size of an HTTP POST message in the HTTP headers (the content-length). It is a violation of the HTTP protocol for the client to transmit more or less data than specified in the content-length header. The present invention recognizes this by tracking the number of bytes transmitted from the client to the server. The HTTP POST content length is specified by the client to be an arbitrary number of bytes. When the client has transmitted content-length bytes, it closes its existing connection and opens a new connection and continues transmitting. The number of bytes in a POST message can be large (e.g. up to $2^{31}$ bytes), so this open and close will happen very infrequently. The result will be a slight latency in the transmission of some data, but no loss of information.

In a preferred embodiment, the present invention requires two sockets, one handling the server-to-client communication via HTTP GET, and the other handling client-to-server communication via HTTP POST. In order for these two sockets to act in concert to provide bi-directional streaming communication, the web server must be aware that they are related halves of a single conversation. This relationship may be established by the client. The client opens the HTTP GET connection first, and includes in its URL a unique session handle (e.g., a randomly generated GUID). When the client subsequently opens the HTTP POST request, it includes the same session handle in the URL. The server is then able to associate the two connections. When the HTTP POST connection must be closed and re-opened due to reaching the content-length limit, the client transmits the same GUID again. The server is then able to associate this new POST socket with the existing GET socket.

The web server needs to understand that this methodology is being employed. It must keep track of calls to a specially designated URL for the original GET connection, associate the session handle with that connection, and then subsequently associate POST connections with the same session handle with that GET connection. It may be desirable, but not necessary, for the web server to spawn a separate thread to handle each connection pair.

Having established the GET and POST connections, the client can receive asynchronous data transmissions from the server via the GET connection and transmit asynchronous data to the server via the POST connection. The server does the reverse, transmitting data via the GET connection and receiving data via the POST connection. The behavior of both client and server are otherwise the same as if they were communicating via a single bi-directional socket.

As will be understood by a person skilled in the art, other HTTP verbs such as HEAD, PUT, PATCH and TRACE may also be used. It will also be appreciated, for example, that it is possible to further modify a server to recognize other verbs or relax protocol restrictions on the HEAD transaction to behave like a GET. So, other verbs may be used if the server is modified to recognize the added/different behavior. Such modifications depart from a strict implementation of the HTTP specification, yet still fall within the present invention.

The unexpected advantages of the present invention in regard to the system and method for secure real-time cloud services are several. To address security concerns, one prior art method for sharing process data on the cloud has been to use a Virtual Private Network ("VPN"). However, from a security perspective, use of a VPN is problematic because every device on the VPN is open to every other machine. Each device (and each user of said device) must be fully trusted on the VPN. Security is complex and not very good, making it virtually impossible to use this approach for open communication between companies. Accordingly, the present invention allows sharing of data between third party companies without requiring that the third parties access an existing VPN, and therefore never exposing computers and devices on the VPN to those third parties. Furthermore, VPNs also incur a performance penalty, either compromising real-time performance or significant additional cost to compensate (e.g., by requiring additional hardware, computational resources and complexity to a system).

Further advantageously, the present invention allows users to connect plant floor equipment to management as well as partner and third-party companies, using software at the plant site that is configured by the client company to allow specific data streams to be uploaded or downloaded.

The present invention may be completely software-based, and can be implemented on existing hardware, therefore not introducing significant complexity to an established network.

Advantageously, using methods disclosed herein, once the client/server connection is established, the data can flow in either direction. Client users can monitor a system in real time, affect changes, and see the effect of their actions immediately, as if they were working on a local system. Or, if required, the system can be configured from the plant to be one-way, read-only.

The present invention provides the ability to connect to any industrial system, using open, standard protocols like OPC, TCP, and ODBC. Such flexibility allows further cost reduction by fully utilizing investments in existing equipment, or enhance new installations with cloud connectivity. Examples uses of the present invention are the addition to existing SCADA systems, enhanced function as an HMI for an individual machine, or access RTUs or even individual embedded devices.

In combination with methods disclosed herein, the present invention supports publish/subscribe data delivery, an event-driven model in which a client registers for data changes one time and then receives subsequent updates immediately after they occur. This low-latency, cloud-based system adds extremely low overhead to the overall data transmission time, effectively keeping throughput speeds to just a few milliseconds (or less) more than the network propagation time.

In one embodiment, the present invention may achieve very high-speed performance is by handling data in the simplest possible format. Providing a data-centric design, the present system can function with various kinds of data sources and users, such as control systems, OPC servers, databases, spreadsheets, web pages, and embedded devices. Preferably, when a connection is made to the cloud server, incoming data is stripped of unnecessary formatting (XML, HTML, OPC, SQL, etc.) and passed as quickly as possible to any registered clients. At the receiving end the data is delivered in whatever format the client requires.

With the methods disclosed herein, a RIA or web-based user interface for secure cloud services provides anywhere-access to register for the service, configure data connection options, and monitor usage and costs. Additionally, all data display screens may be provided via the web-based interface. This web-based HMI allows users to create pages from anywhere, and deploy them immediately.

Further advantageously, one of the benefits of cloud computing is its ability to scale up or down to meet the needs of its users. The present invention can not only handle bursts of high-speed activity in the data flow, it can also be quickly configured to meet the needs of a growing system. Users can add data points to a particular device, or bring on new devices, new SCADA systems, even new locations and installations through an easy-to-use, web-based configuration interface.

The present invention is operable as a real-time industrial system, and can maintain a suitable level of performance and security in a cloud environment. Its sophisticated connectivity options allow the primary control system in a plant to continue functioning without disruption. The result is a robust and secure feed of live process data into an enterprise to provide opportunities for real-time monitoring, collaboration, and predictive maintenance.

Referring to FIG. 1, in one embodiment, RIA 101 makes a data connection directly to a program that is acting as both data source and data server 100. This could occur where the data source is both a collector of raw data and a transmitter via a TCP/IP protocol. An example of this would be an OPC-UA server embedded within a PLC. Another example would be an embedded device that acts as a data source and provides a TCP/IP server capability offering a custom TCP/IP interface. Yet another example would be a stock market data feed that offers a TCP/IP interface.

Figure 2:
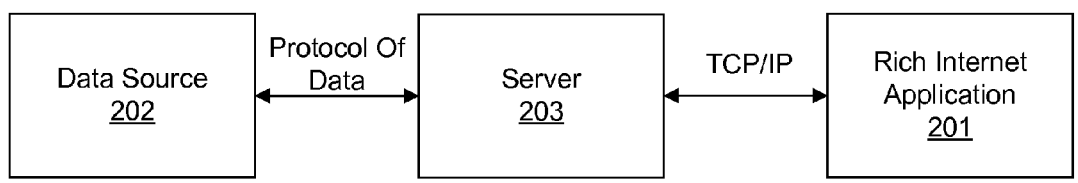
FIG. 2 is an exemplary block diagram illustrating a connection between a RIA, a server, and a separate data source, in accordance with one embodiment of the invention.

Referring to FIG. 2, in one embodiment, another configuration comprises a separate data source 202 and server 203. This configuration extends the communication model by converting the data protocol of data source 202 into a TCP/IP protocol that can be processed by RIA 201. This greatly broadens the number and type of data sources 202 by allowing the server 203 to interact with data sources 202 that do not provide a TCP/IP interface directly.

Figure 3:
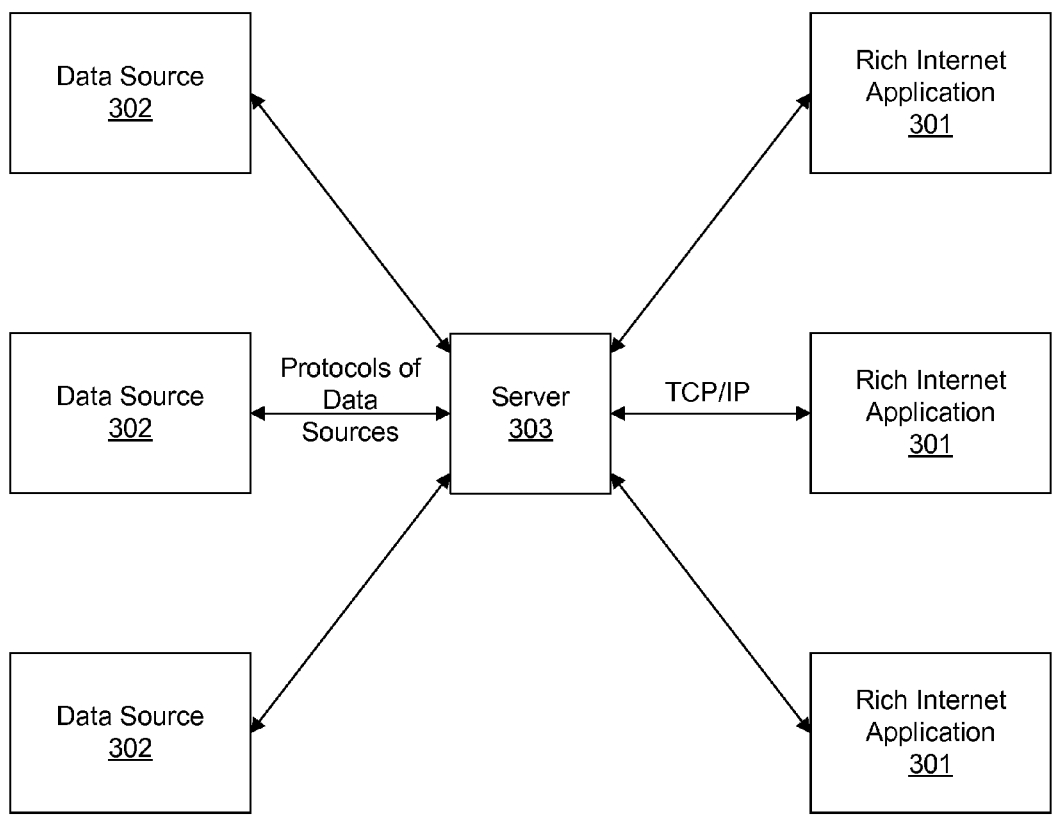
FIG. 3 is an exemplary block diagram illustrating connections between multiple RIAs, a server, and multiple, separate data sources, in accordance with one embodiment of the invention.

Referring to FIG. 3, in one embodiment, server 303 may manage connections to more than one data source 302 and to more than one RIA 301 simultaneously. This more complex configuration performs aggregation of data from data sources 302 and RIAs 301 into a single data set that is accessible from anywhere on the TCP/IP network.

In another embodiment, a system may include multiple servers, interconnected with one or more data sources and/or one or more RIAs.

Figure 4:
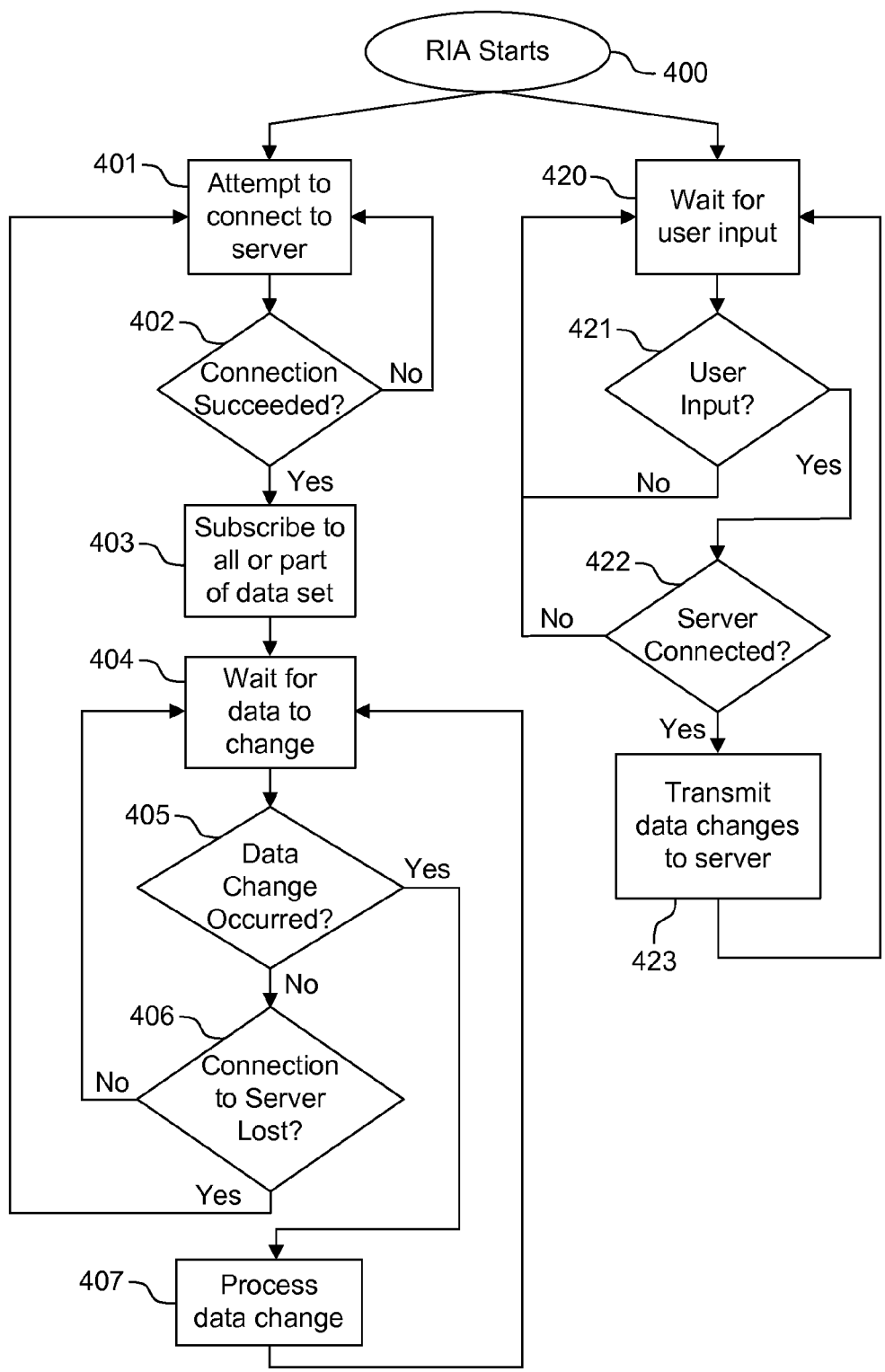
FIG. 4 is an exemplary flowchart illustrating one method of RIA control flow, in accordance with one embodiment of the invention.

Referring to FIG. 4, in one embodiment, a method of RIA behavior and control flow is shown. The RIA does not require an explicit stopping criterion, though one or more may be incorporated. The RIA is stopped implicitly when a user closes the web browser or page containing the RIA. The RIA simultaneously follows two flows of control, which can be either interleaved in a single program thread or implemented in separate program threads. The method may comprise additional processing specific to the RIA.

In the first flow of control, the RIA attempts to establish and maintain a connection to a server, and to respond to changes in the data available from the server. The RIA first attempts to establish a connection (Step 401). If the connection is not successful, it simply re-tries that connection indefinitely. If the connection succeeds (Step 402) then the RIA may subscribe to all or part of the data set (Step 403). Alternatively, it is possible for the server to implicitly subscribe the RIA to the data set based on the presence of a connection, in which case Step 403 may be skipped. In addition to a subscription, the RIA may also transmit other information to the server to configure the behavior of the data transmission, such as a minimum time between updates or timeout parameters on the connection.

Having once established a connection, the RIA waits for notifications of a change in data from the server (Step 404). If a data change has occurred (Step 405) then the RIA processes that data in some fashion (Step 407). This processing may be to modify an internal state of the RIA, modify a graphical representation, play a sound or any other programmatic response that the RIA designer determines. If no data change occurs, the RIA checks to determine if the connection to the server has been lost for any reason (Step 406). If the connection has not been lost, the RIA returns to wait for a data change to occur (Step 404). If the connection has been lost then the RIA re-tries the connection to the server (Step 401).

Simultaneously with Steps 401 through 407, the RIA may also accept user input, allowing the user to generate changes in the data that can be propagated back to the server. The RIA waits for user input (Step 420) either in a separate program thread or multiplexed with Steps 401 through 407.

FIG. 4 exemplifies a separately threaded method. If user input has occurred (Step 421) then the RIA can attempt to transmit the resulting data to the server. It does this by first checking to see if the server is connected (Step 422). If so, the RIA transmits the new data to the server (Step 423). If not, the RIA waits for more input (Step 420). The check for the server connection (Step 422) may be implicit in the attempt to transmit the data, in which case Steps 422 and 423 are combined in practice.

The RIA may also be non-interactive such that user input is not accepted, in which case Steps 420 to 423 can be omitted.

Figure 5A:
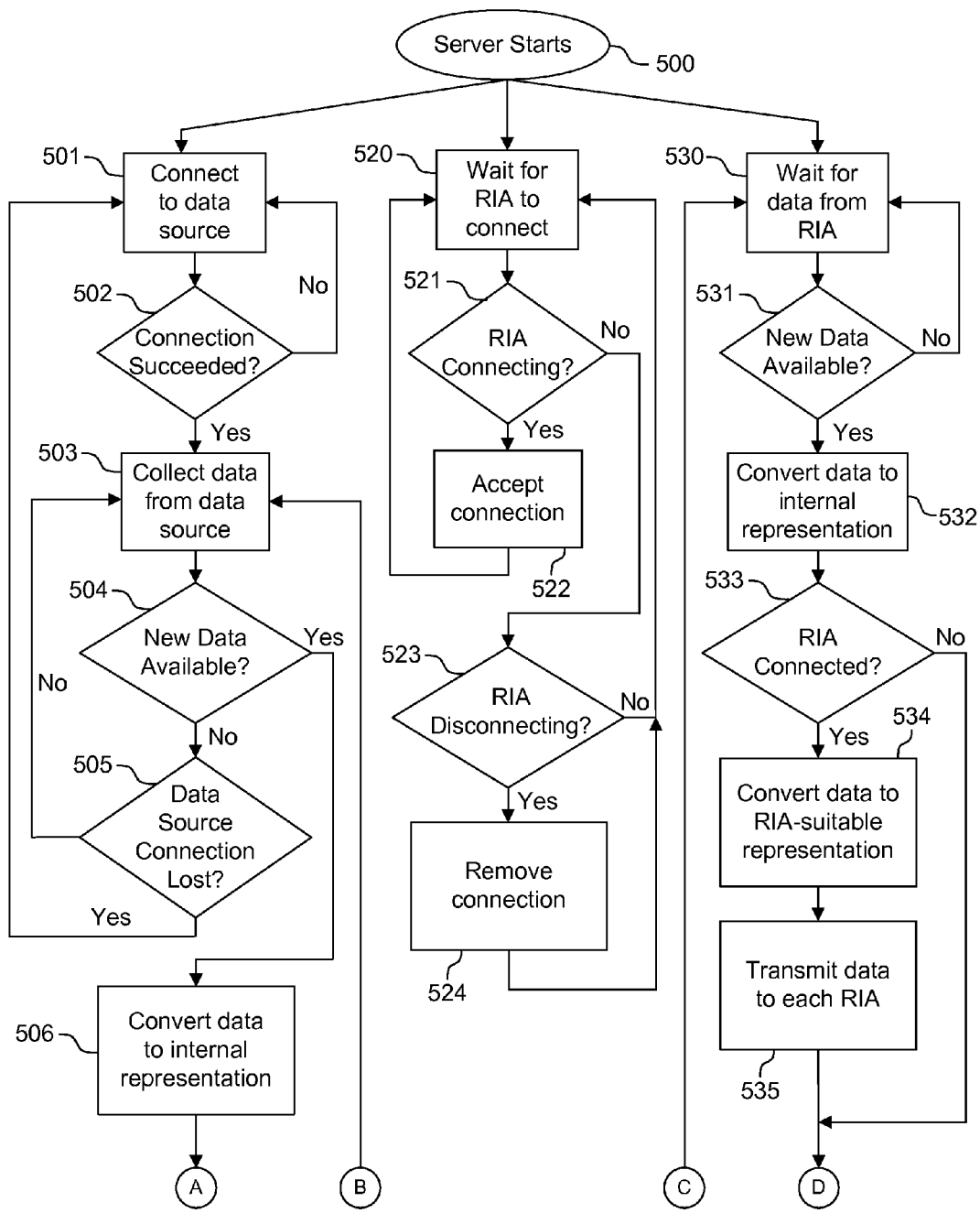
FIG. 5a, b is an exemplary flowchart illustrating one method of operation of a server, in accordance with one embodiment of the invention.
Figure 5B:
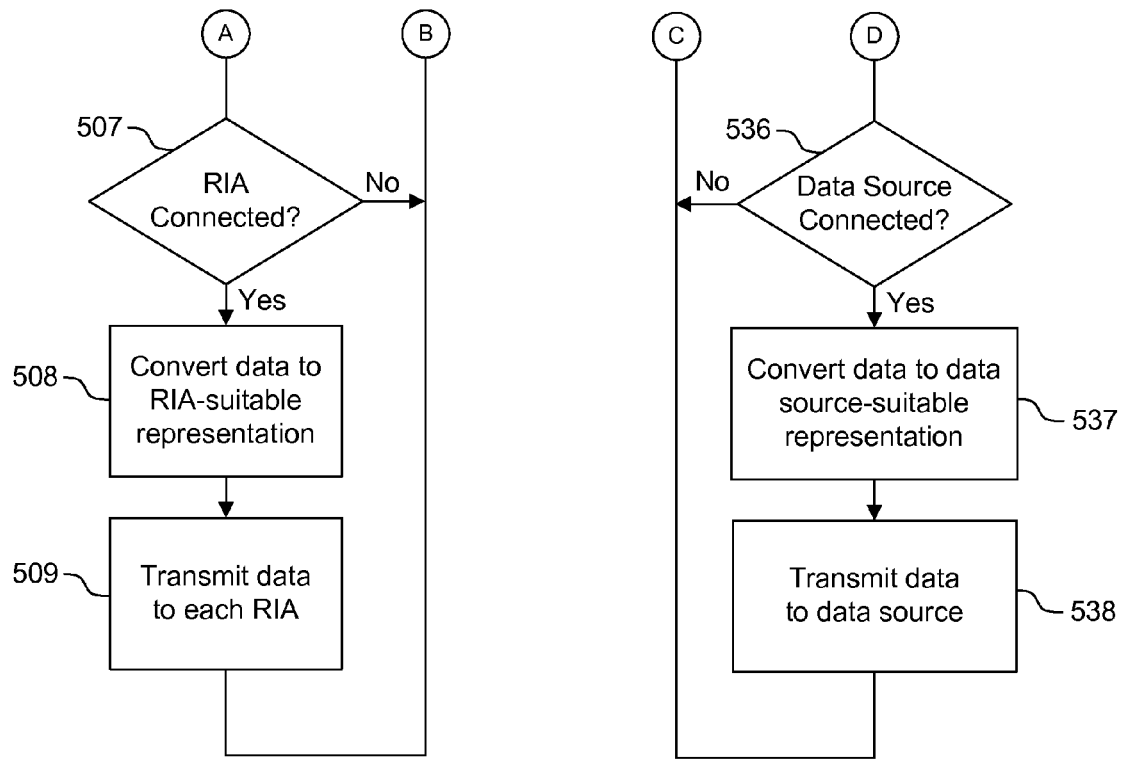

Referring to FIG. 5, in one embodiment, the method of operation of a data server is shown. The server may be simultaneously collecting data from zero or more data sources while serving data to zero or more RIA connections. The two main flows of control can be implemented in separate threads, or by interleaving the two flow control paths within a single thread.

In order to interact with a data source, the server must first establish a connection to that data source (Step 501). Normally, the server initiates this connection to the data source. In some cases, the data source may initiate the connection to the server. If the connection succeeds (Step 502), the server begins collecting data from the data source (Step 503). If the connection fails, the server re-tries the connection to the data source (Step 501). If the data source is the initiator of the connection to the server, then Steps 501 and 502 collapse to a single wait state and the server passively waits for the data source to connect. The data collection (Step 503) will follow a method appropriate to the data source, and may differ from one data source to another. The server can be made to accommodate any data source whose data can be represented in the server. If new data becomes available from the data source (Step 504), the server converts that data to the server's internal data representation. This allows the server to aggregate data from a variety of data sources using different data representations. Step 506 can be omitted in the simple case where the data source, server and RIA all use the same data representation. The server then attempts to transmit the data to each RIA. The server may first establish that a RIA is connected (Step 507). If one or more RIAs are connected, the server converts the data to a representation suitable for the RIA (Step 508) and transmits that data to each connected RIA (Step 509). If no RIA is connected, the server continues collecting data from the data source (Step 503). The server repeats this sequence (Steps 501-509) indefinitely. The server may choose not to collect data from a data source when no data sink is connected to the server that requires data from that data source.

Simultaneous with, or interleaved with, collecting data from the data source, the server also manages connections from RIAs. The server waits for a connection from an RIA (Step 520). When an RIA attempts to connect to the server (Step 521) the server accepts the connection (Step 522) and continues to wait for connections from other RIAs. While waiting for an RIA to connect, the server must also determine whether an existing RIA connection has disconnected (Step 523). If an RIA has disconnected, the RIA connection is removed from any tracking in the server (Step 524) so that no attempt is made in future to transmit data (Step 509) to the disconnected RIA. The server repeats this sequence (Steps 520-524) indefinitely. The server may apply acceptance criteria when the RIA attempts to connect (Step 522) such that the server may refuse the connection for any reason, such as an authentication failure or a server-applied limit on the maximum number of concurrent connections from RIA instances.

Simultaneously with, or interleaved with, collecting data from the data source and managing new connections from RIAs, the server may also receive data from RIAs already connected. The server waits for data to arrive from the RIA (Step 530). When new data arrives (Step 531), the server converts this data into the server's internal data format (Step 532). The server then determines if any RIA is currently connected (Step 533). The server then converts the data to a format suitable for receipt by the RIA (Step 534) and transmits the data to each currently connected RIA (Step 535). The server then determines if any data source that requires this change of information is currently connected (Step 536). For each data source requiring the information that is currently connected to the server, the server converts the data to a format suitable for that data source (Step 537) and transmits the data (Step 538). The server repeats this sequence (Steps 530-538) indefinitely.

Steps 501 through 509 can be replicated repeatedly for each data source to which the server may connect.

Steps 520 through 524 can be replicated repeatedly for each RIA from which the server may receive a connection.

Steps 530 through 538 may be replicated for each connected RIA, or may be multiplexed such that Step 530 waits simultaneously for all connected RIAs at once, or any combination of these options.

It is understood that the methods exemplified in FIG. 4 and FIG. 5 may be modified to include additional capabilities, including: explicit stopping conditions for both the RIA and the data server; the ability of the server to wait passively for a data source to connect to the server; the ability of the server to actively connect to the RIA; the ability of the server to simultaneously manage connections to multiple data sources; the ability of the server to simultaneously manage connections to multiple RIAs; and the ability of the server to simultaneously receive data from multiple RIAs.

Figure 6:
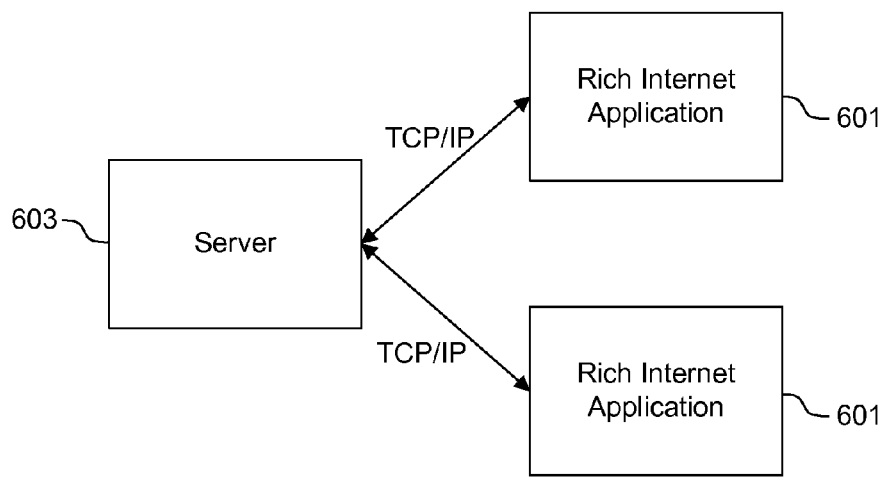
FIG. 6 is an exemplary block diagram illustrating a data server managing simultaneous connections to multiple RIAs, in accordance with one embodiment of the invention.

Referring to FIG. 6, in one embodiment, the data server's 603 ability to simultaneously manage connections to multiple RIAs 601 advantageously allows for RIAs 601 to communicate among one another through the server. Any information transmitted from RIA 601 to server 603 will be treated by the server as if the RIA 601 is a data source, and will propagate that data to any other RIAs 601 that are connected to the server and have subscribed to that data. Surprisingly, this effectively creates a network of RIAs intercommunicating in real time. In fact, server 603 may be used to enable communication among any number of client applications, using any combination of protocols that the server supports.

Figure 7:
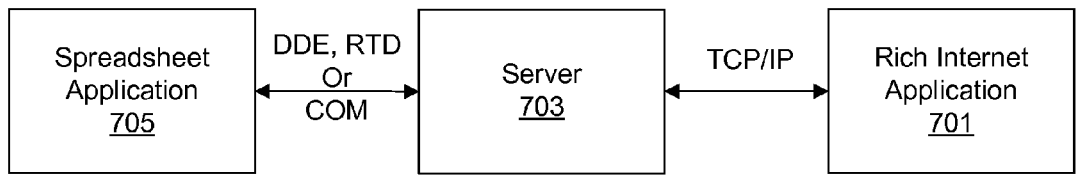
FIG. 7 is an exemplary block diagram illustrating real-time transmission of data via a local or wide area network between a spreadsheet application and a RIA, in accordance with one embodiment of the invention.

Referring to FIG. 7, in one embodiment, a substantial benefit of this invention is the ability to present data in RIA 701 that originates from sources that cannot otherwise be accessed via a network. In this embodiment, data originating in spreadsheet application 705, such as Microsoft Excel, may be transmitted via a local or wide area network, which was not possible prior to the present invention. Data transmission from Microsoft Excel is limited to DDE, RTD or ad-hoc communication through fragile scripts. No protocol supplied by Microsoft Excel, including DDE, RTD and ad-hoc communication through scripts, enables real-time communication with a RIA. The invention allows any application to communicate in real time with the spreadsheet data over any TCP/IP network, vastly broadening the scope of applications for spreadsheet data. The combination of this communication ability with RIA 701 offers the ability to have multiple simultaneous users interacting with a single spreadsheet through a simple web browser connection. This same functionality extends to any protocol that server 703 supports.

When running a RIA within a web browser, the RIA must be served to a web browser using a web server. That is, the user enters a URL into a web browser, or clicks a link within a web page for that URL, causing the web browser to load a web page containing the RIA. The URL is serviced by a web server such as Microsoft IIS™ or Apache™. The sequence of events when loading and connecting the RIA is thus:

1. The user selects a URL in the web browser
2. The web browser loads the page containing the RIA from the web server
3. The web browser starts the RIA
4. The RIA connects to the data server via TCP/IP
5. The RIA subscribes to data in the data server
6. The data server begins transmitting data according to the subscription
7. Data service continues until the RIA disconnects or is otherwise stopped This sequence requires that a web server be present and configured to serve the RIA. It may be convenient to embed the web server capability within the data server to reduce the number of system components and to more tightly integrate the web functions with the data functions of the RIA.

It will be readily apparent to those skilled in the art that the RIA may be executed from an embedded browser or a separate non-browser host (sometimes referred to as an out-of-browser mode for the RIA) to launch a RIA session. The URL and web browser may not be evident to the user. Accordingly, the first three steps in the sequence of events above may be modified to reflect these alternate embodiments.

In the present invention, a RIA may be any application written using a RIA framework that is capable of using or generating data.

In one embodiment, the RIA displays real-time data visually to a user. The visual components may be gauges, trend graphs, progress bars, buttons, images and other visual representations common in desktop applications. Since there is a wide variety of possible representations, and the most suitable representation for a particular data set will differ from the most suitable representation for another data set, the RIA should be user-configurable. This means that the user may be presented with a visual configuration tool that allows him to associate data with visual "objects". A collection of these visual objects can be arranged together into a visual "page" commonly used to display related information. The user could then create multiple pages to display different sets of related information.

In order to provide to the user the ability to customize the data visualization, the RIA must provide either integrated or separate customization functionality, more commonly referred to as an editor. This editor provides a means by which the user specifies the visual design of pages displaying the real-time data. The editor may also provide the ability to design specialized versions of visual objects.

The information regarding the design of individual visual objects and the design of the visual pages should be stored by the web server. This allows the user to create data visualization that can be viewed by any other user with the necessary access privileges at the web server. The RIA interacts with the web server to store and retrieve documents stored in a format such as XML. The transmission of this information may be performed either through an existing real-time data connection or using a separate HTTP connection. A built-in web server within the data server simplifies the implementation of this transmission, but is not necessary.

Figure 8:
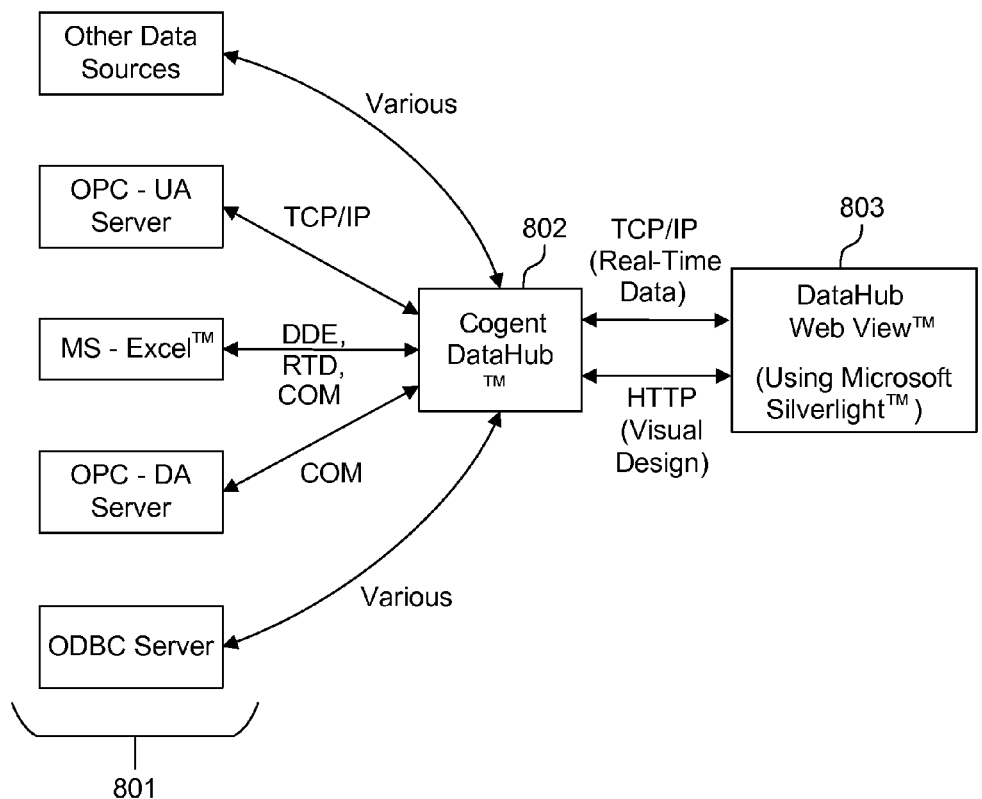
FIG. 8 is an exemplary block diagram illustrating a system implementation, in accordance with one embodiment of the invention.

In one embodiment of the invention, a system implementing the methods of the invention comprises the following software applications:

1. Cogent DataHub™ (Cogent Real-Time Systems Inc.) acting as the data server
2. Cogent DataHub (Cogent Real-Time Systems Inc.) acting as the web server
3. Microsoft Silverlight (Microsoft Corp.) acting as the RIA framework
4. DataHub API for .Net (Cogent Real-Time Systems Inc.) acting as a protocol implementation layer for Microsoft Silverlight
5. DataHub WebView™ (Cogent Real-Time Systems Inc.) acting as a RIA for display of real-time data in a web browser
6. DataHub WebView (Cogent Real-Time Systems Inc.) acting as a display editor for visual object and page design In addition, Cogent DataHub may send and receive data from a variety of data sources, including:

1. Microsoft Excel™ (Microsoft Corp.) acting as a spreadsheet application
2. OPC-DA server (various manufacturers) acting as a data communication interface
3. OPC-UA server (various manufacturers) acting as a data communication interface
4. OPC Xi server (various manufacturers) acting as a data communication interface
5. ODBC server (various manufacturers) acting as a database interface Referring to FIG. 8, in one embodiment, depending on the particular implementation, zero or more data sources 801 are attached to the Cogent DataHub™ 802, which in turn is attached to a Cogent DataHub WebView™ RIA 803 for delivering real-time data displays.

In alternate embodiments of the invention, the RIA framework may be any RIA framework capable of supporting a persistent network connection. Examples of alternate such RIA frameworks include Adobe Flash™ and Adobe Flex™. It is appreciated that other RIA frameworks may also be suitable.

The RIA may be any application created using the RIA framework that can consume or produce data using the server's TCP/IP communication protocol.

The RIA framework could be integral to the web browser, as would be the case, for example, if HTML5 supported the necessary TCP communication mechanism.

The data server may be any application designed to collect data from a data source or act as a data source itself, as long as it also supplies a TCP/IP communication method that can be accessed by a constructed RIA.

A data source may be any application or system capable of producing real-time data that can be converted into a format suitable for representation within the server.

A data source may also be any application or system capable of producing non-real-time data that can be converted into a format suitable for representation within the server. The server can poll this data repeatedly or collect it by subscription to provide the data to a RIA even in the case that the original data is not real-time. For example, a database management system (DBMS) is generally not real-time, but the data can be polled repeatedly to create a periodically updating data set within the server, thus supplying a RIA with a pseudo-real-time view of the data within the DBMS.

The server and the data source may be combined into a single application, as may be the case with an OPC-UA server, or with an embedded device that offers access to its data via a TCP/IP connection.

The web server may be any application capable of serving the web page containing the RIA.

A program developed using any compiled or interpreted computer language that can open and interact with a TCP/IP socket may be used in place of a RIA, which may or may not run within a web browser. Similarly, the methods of the present invention may also be implemented using code executable directly in a browser, in an out-of-browser host, or through an extension of the browser, in place of a RIA, such that the browser, out-of-browser host, or browser extension can open and interact with a TCP/IP socket, make a persistent network connection and, optionally, offer graphical capabilities.

Referring to FIG. 9, in one embodiment, a mechanism for bi-directional streaming communication between a client and a server using two HTTP connections is shown. It is assumed that the server is already running, and is listening for TCP connections on a port agreed upon by the server and the client. For clarity, specifics of the HTTP protocol are not shown or described, as that is well-defined in the industry, and known to a person skilled in the art. Also, the handling of immaterial error conditions is omitted.

Figure 9A:
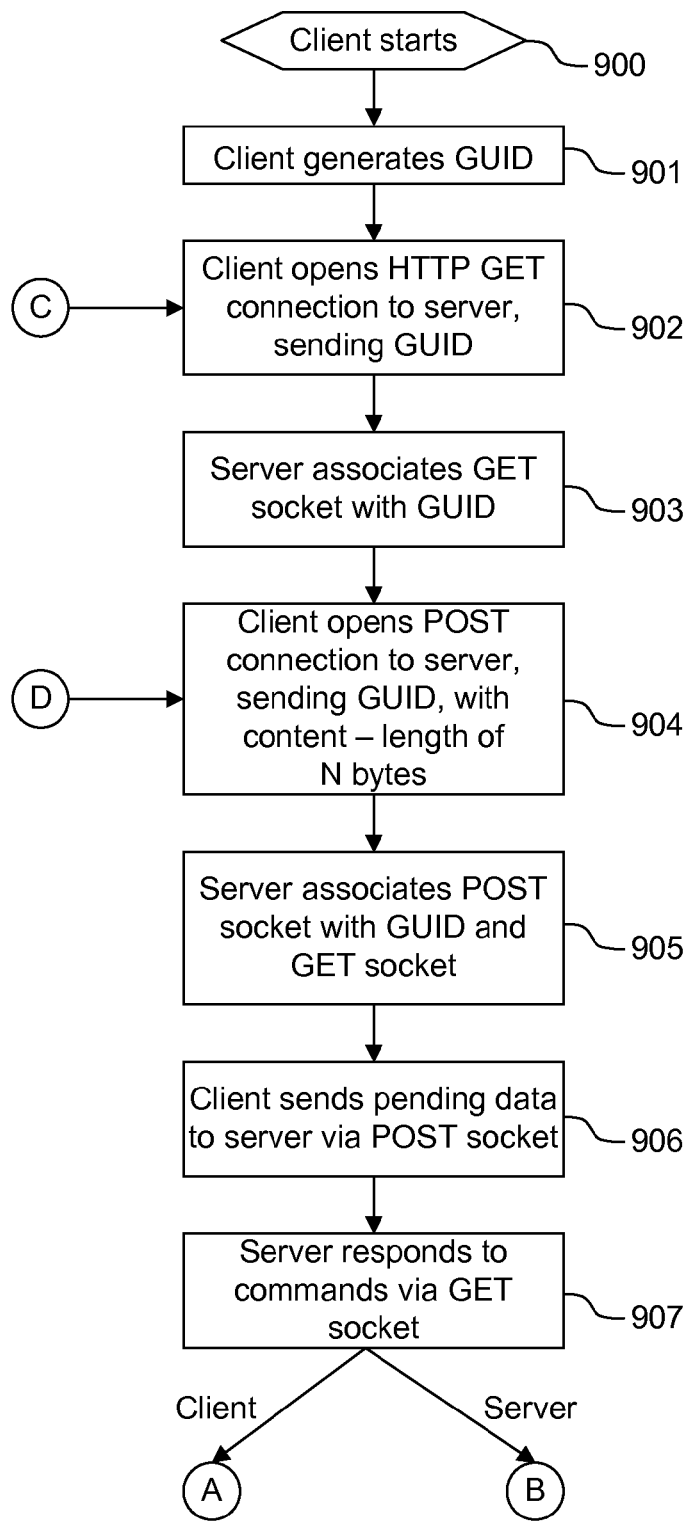
FIG. 9a, b, c is an exemplary flowchart illustrating one method of operation of a client and a server, in accordance with one embodiment of the invention.

As shown in FIG. 9*a*, the client starts, or begins, its attempt to communicate with the server via bi-directional HTTP streaming (Step 900). First, the client generates a GUID to identify the present communication session (Step 901). Alternatively, the server could generate a GUID at the client's request (not shown). This GUID will be used by the server to associate the GET and POST sockets with one another and with the client connection. Next, the client opens an HTTP GET transaction, supplying its GUID as part of the URL (Step 902). The server records this GUID and associates it with the HTTP GET socket (Step 903). The server holds this socket open. The client then opens an HTTP POST transaction with the server (Step 904), again supplying the GUID as part of the URL, or in the body of the POST message. The client specifies the content-length of this HTTP POST transaction to be an arbitrary number of bytes that is acceptable to the server. The server associates the HTTP POST socket with the GUID, therefore creating a correspondence among the client, the POST socket and the GET socket.

Once the POST and GET sockets have been successfully opened, the client may transmit configuration information and any data pending from a previous connection via the POST socket (Step 906). The client may choose to send configuration information only on the first connection of the POST socket for a given session. On subsequent POST socket connections, there may be data that was previously undeliverable that is delivered at this point. If any commands or data were transmitted in Step 906, then the server processes them (Step 907) and generates zero or more responses that the client will receive in Step 908.

Once the connection is fully established, the client and server respectively enter wait states where they wait either for data arriving from the other, or for events that would cause them to emit data to the other. That is, the server may wait for data to arrive from the client, or for a locally generated (server-generated) event to occur (Step 919), as illustrated in FIG. 9*c*. Similarly, the client may wait for data to arrive from the server, or for a locally generated (client-generated) event to occur (Step 908), as illustrated in FIG. 9*b*.

Figure 9B:
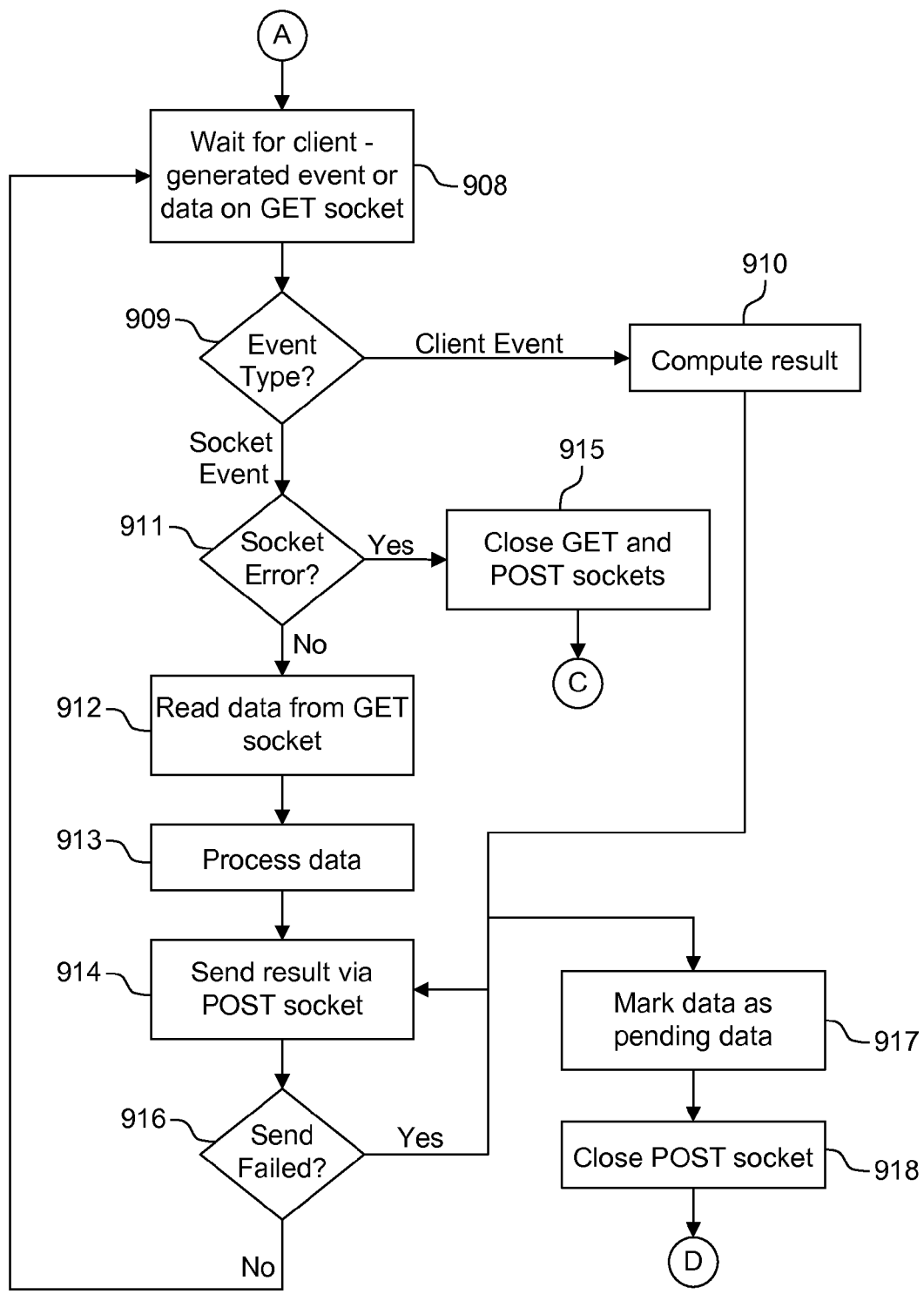
Figure 9C:
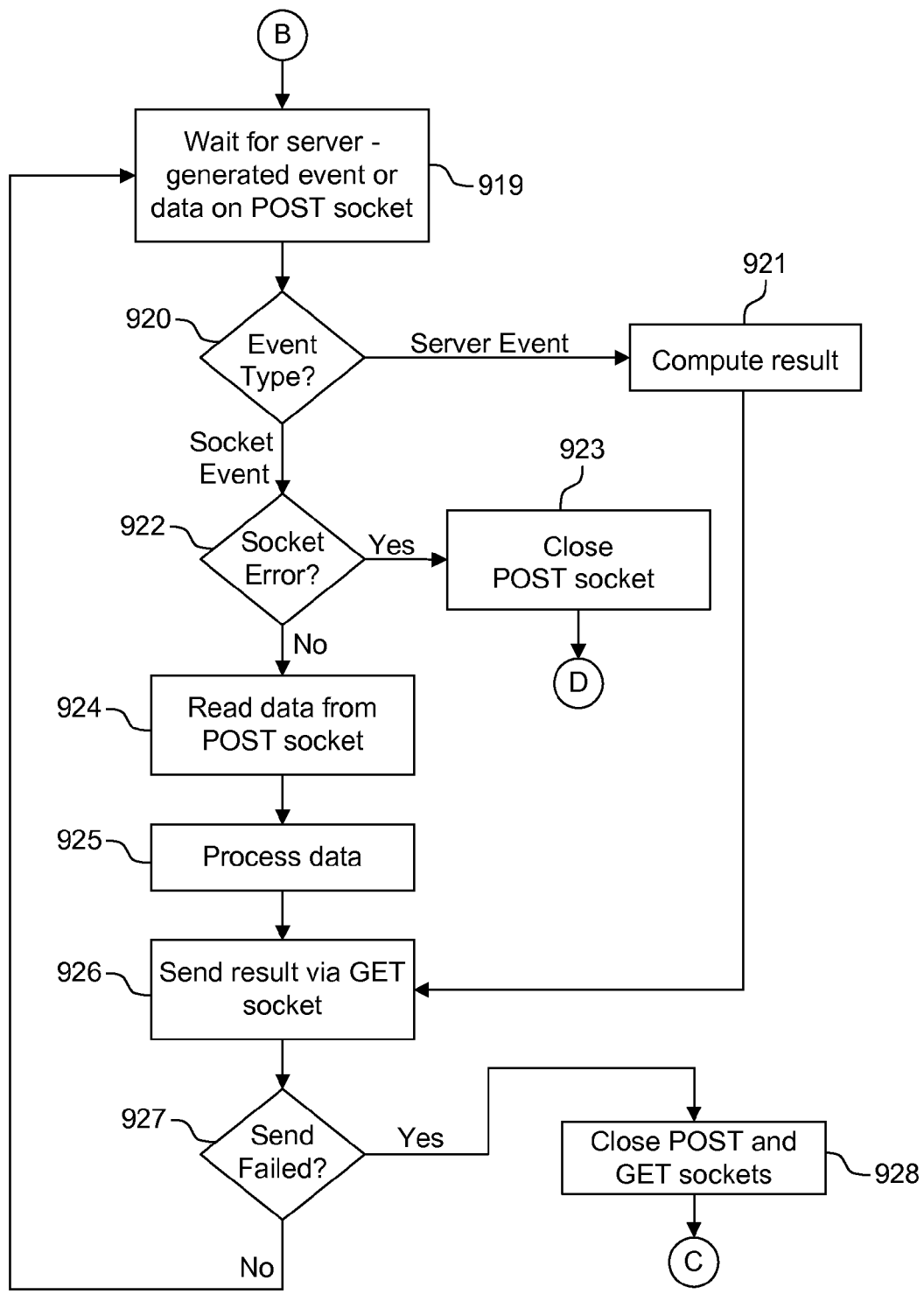

Referring to FIG. 9*b*, the client will subsequently enter a loop where it waits for an event (Step 908) and processes it according to its type (Step 909). If the event is an event originating from the GET socket, the client will first check whether that event is a socket error (Step 911). If so, the client closes its end of the GET and POST sockets (Step 915), effectively closing the communication session with the server, and tries to create a new session with the server by returning to Step 902, or alternatively to Step 901 (not shown). If the event is an event originating from the GET socket and is not an error, the client reads the available data from the socket (Step 912), and processes it in some manner (Step 913). This processing may generate a result that can be transmitted back to the server via the POST socket (Step 914). The result may be a nil result, in which case nothing is transmitted back to the server. Alternatively, the client may optionally choose to transmit nothing back to the server.

The result transmission via the POST socket in Step 914 could fail. At least one failure mode is an HTTP protocol violation. That is, once the client has transmitted content-length bytes to the server, it is a violation of the HTTP protocol to send more bytes on the POST socket. Subsequent attempts to send data on the POST socket will fail, so the client checks for this and other failures (Step 916). If a transmission failure occurs then the client will mark the data for this transmission as pending (Step 917), and will close the POST socket (Step 918). The client will then attempt to re-open the POST socket by returning to step 904. In this instance, the client should not close and re-open the GET socket, since that would terminate the entire session and would cause the pending transmission to be lost. By re-opening the POST socket, the client and server maintain their session even though a socket reconnection is taking place.

If the client generates an event internally, or as a result of user activity, a timer, or other external stimulus that requires communication with the server in Step 909, then the client will perform whatever processing is required to compute data to be transmitted to the server (Step 910). This data is effectively the result data of the event, which is then transmitted to the server (Step 914) and follows the same transmission method as for result data from a socket event.

The client may loop indefinitely, establishing the connection to the server and re-establishing that connection should it fail. The client may choose to signal failures and reconnection states to a user or other program, or may simply reconnect to the server without notification.

After Step 907, the server will also enter a loop where it waits for an event in Step 919 and processes it according to its type (Step 920), as illustrated in FIG. 9c. If the event is an event originating from the POST socket, the server will first check whether that event is a socket error (Step 922). If the event is a socket error, the server closes its end of the POST socket (Step 923), effectively requesting that the client re-establish its POST socket. This allows the client to maintain its session with the server by only re-establishing one of the two communication sockets. If the event is an event originating from the POST socket and is not an error, the server reads the available data from the socket (Step 924), and processes it in some manner (Step 925). This processing may generate a result that can be transmitted back to the client via the GET socket (Step 926). The result may be a nil result, in which case nothing is transmitted back to the client. Alternatively, the server may optionally choose to transmit nothing back to the client.

The resultant transmission via the GET socket in Step 926 could fail. The server checks for transmissions failures (Step 927), and if a transmission failure occurs then the server will close both the POST and GET sockets, effectively ending the session (Step 928). The server does not attempt to re-establish a connection with the client, but rather waits for the client to re-establish the connection if necessary. This effectively will return the client/server system to Step 902 or, alternatively, to Step 901 (not shown). It may be desirable in some implementations to maintain the same GUID through multiple sessions, although this is not a required feature.

If the server generates an event internally, or as a result of user activity, a timer, another connected client, data from a data source, or other external stimulus that requires communication with the client in Step 919, then the server will perform whatever processing is required to compute data to be transmitted to the client (Step 921). This data is effectively the result data of the event, which is then transmitted to the client (Step 926) and follows the same transmission method as for result data from a socket event.

As would be readily appreciated by a person skilled in the art, there can be errors handling in Steps 901 through 907 that would close any open sockets and re-start the connection process at Step 901. Although these errors handling have not been illustrated in FIG. 9 for clarity, they would be included in a preferred embodiment. As will be appreciated by a person skilled in the art, the client may choose to terminate the connection (e.g. closing the browser client), and any such termination may be handled by the server in the same manner as a transmission error. That is, the server will close both the GET and POST sockets, terminate the session and wait for a client to connect (Step 900).

The client and server can implement wait states in any number of ways, including creating a new process thread to perform a synchronous wait or performing a multiple-event wait in a single thread. These are implementation details that will depend on choices made during the client and server implementations, but do not depart from the scope of the present invention.

Surprisingly, a substantial benefit of the present invention is the ability to provide high-speed, bi-directional communication between a client and server using a HTTP or HTTPS-mediated socket, while overcoming limitations in the HTTP protocol, and also maintaining operability with existing browser and RIA technology.

In an alternate embodiment, the present invention and the bi-directional communication method is also applicable to web client/servers employing a RIA.

Advantageously, the present invention is operable on any device that is capable of opening an HTTP or HTTPS-mediated socket. For example, the client/server implementation may comprise multiple servers propagating data in real-time over a network or the Internet, optionally in a secure manner via HTTPS, without any major and therefore costly changes in existing infrastructure (e.g., security policies, firewalls, software, hardware, etc.).

Figure 10:
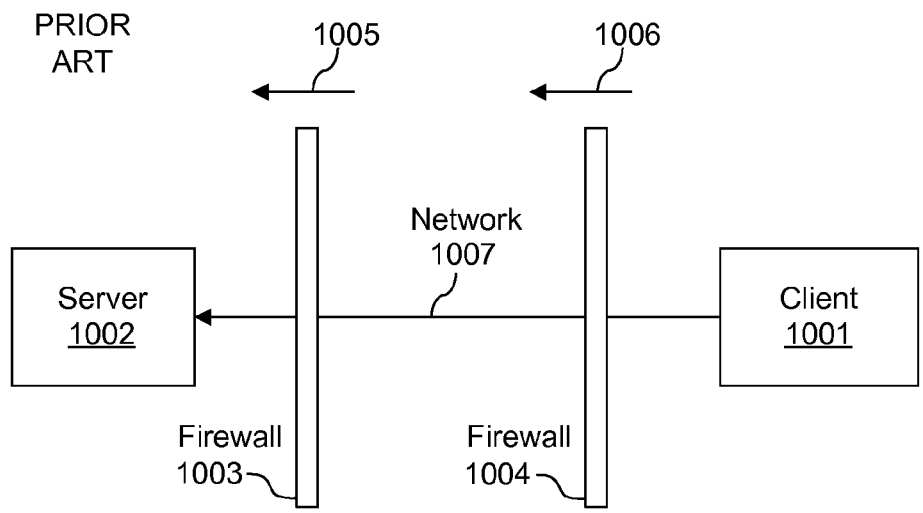
FIG. 10 is an exemplary block diagram illustrating a prior art system implementation.

Referring to FIG. 10, a prior art system for providing direct communication between a server 1002 and a client 1001 separated by a network 1007 is shown, as envisioned by a traditional SCADA system. In this example implementation, the server 1002 and client 1001 are situated behind firewalls 1003, 1004 to protect from unauthorized access from any third parties (not shown) on network 1007. Arrow 1006 symbolically shows client 1001 originating a request for data located on server 1002, and arrow 1005 shows server 1002 waiting for incoming requests from client 1001. In order for the client 1001 to access data on server 1002, the server's firewall 1003 must be configured to allow an incoming connection from outside firewall 1003. In this example, server 1002 is exposed to incoming requests originating from network 1007, and therefore firewall 1003 provides a point of attack or vulnerability that may be exploited.

When the network 1007 is a private network, the assumption is that a concerted malicious attack on the server 1002 through the open port on the firewall 1003 is unlikely and an acceptable risk. However, when the network 1007 is a public network (e.g. the Internet), the likelihood of a concerted attack on the server 1002 is high, and the risk is unacceptable.

Figure 11:
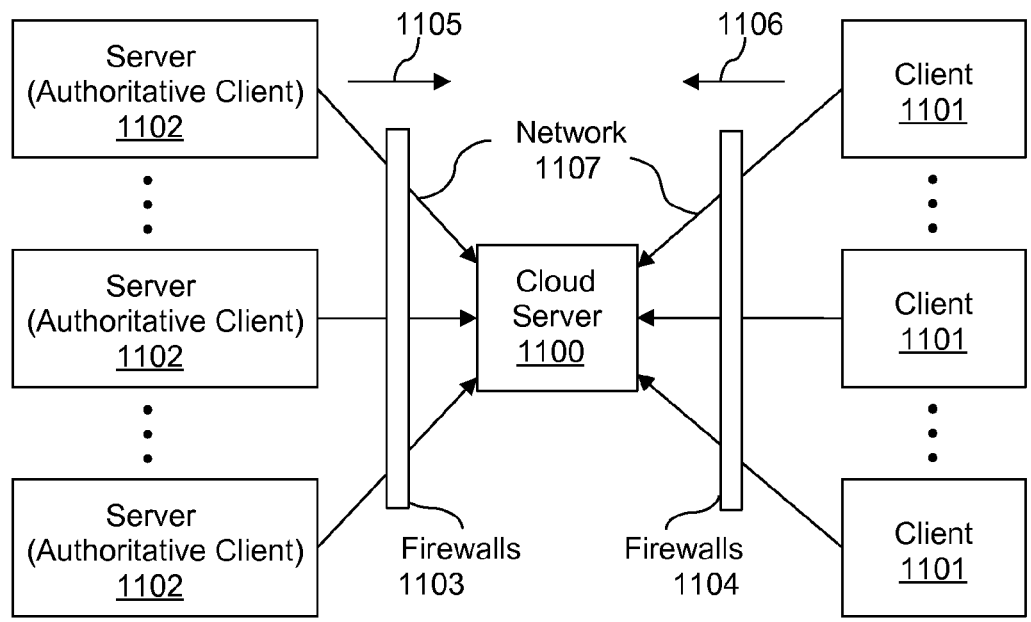
FIG. 11 is an exemplary block diagram illustrating a system implementation, in accordance with one embodiment of the invention.

Referring to FIG. 11, in one embodiment, a system for providing secure, real-time data over a network 1107 is shown. In contrast to the prior art system shown in FIG. 10, the novel system shown in FIG. 11 illustrates the differences between a direct client/server connection, and a cloud-based system as provided by the present invention.

In the present invention, a cloud server 1100 is situated away from both the server 1102, acting as an authoritative client, and the user client 1101 (non-authoritative). Both the server 1102 and client 1101 initiate outbound connections, as shown by arrows 1105, 1106, to the cloud server 1100, through their respective firewalls 1103, 1104. The firewalls 1103, 1104 are not required to provide any open inbound ports. This configuration is equally secure regardless of whether the network 1107 between server 1102 and client 1101 is private or public.

The server or authoritative client 1102 decides what data to send to the cloud server 1100. Further, each server 1102 can set each data stream to be one-way or two-way, and can send some or all of its data, depending on its needs. Preferably, this configuration is set by the customer at the authoritative client by way of a connector, provided in the form of a software application described above (the DataHub). Accordingly, configuration may be set entirely in the connector, not at the cloud server, thereby optionally providing an additional layer of security should the cloud server be compromised.

Also shown in FIG. 11 are multiple servers 1102 acting as authoritative clients, which is an unexpected result made possible by the present invention. Specifically, the present invention allows multiple servers 1102 to act as authoritative clients for their own data sets (not illustrated), and aggregated at the cloud server 1102 for efficient consumption by one or more clients 1101. Surprisingly, this allows for servers 1102 to be located in physically separate locations from each other (e.g. in different plant facilities located around the world), while producing a unified data set at the cloud server such that the client(s) 1101 see the unified data set as if it were produced from a single system. That is, distributed system appears to the client as a single system. Such functionality is not possible in traditional SCADA systems. This is advantageous at least to provide convenience and the ability to simultaneously monitor an entire network of systems, and to share data among the servers 1102. Examples of such applications are broad, for instance coordinated operation of vehicle fleets, networks of devices, global financial trading systems and redundant parallel systems.

When an authoritative client (server 1102) connects to the cloud server 1100, it does not know whether the server 1100 contains the data items that the authoritative client 1102 intends to publish, and where those data items do exist in the server 1100, the client 1101 does not know their current values. Typically a client will rely on a server to provide the items and their values, but in the case of an authoritative client 1102 it is the client 1102 which must provide the items and their values. Thus, upon an initial connection, the authoritative client 1102 must emit its entire data set and current values, ignoring and overwriting any values already present in the server 1100. The current invention optionally provides this behavior, allowing any client to select whether it will be authoritative for a particular data set.

Similarly, when an authoritative client 1102 disconnects from the cloud server 1100, it must be able to inform other connected clients that the authoritative source of data is no longer providing data. The authoritative client 1102 informs the server that it is authoritative, and additionally instructs the server 1100 to alter the properties of the data items in the server when the client disconnects to indicate that those data items are "not connected". The cloud server 1100 must co-operate in this process, since the authoritative client has already disconnected before the data items are marked as "not connected", and the server must propagate this change of status (sometimes referred to as "quality") to other connected clients.

The combination of these important features ensures that the data on the server 1100 is either consistent with the data on the authoritative client 1102, or it is in a known error state to indicate that the authoritative client 1102 is not connected to the cloud server 1100.

Figure 12:
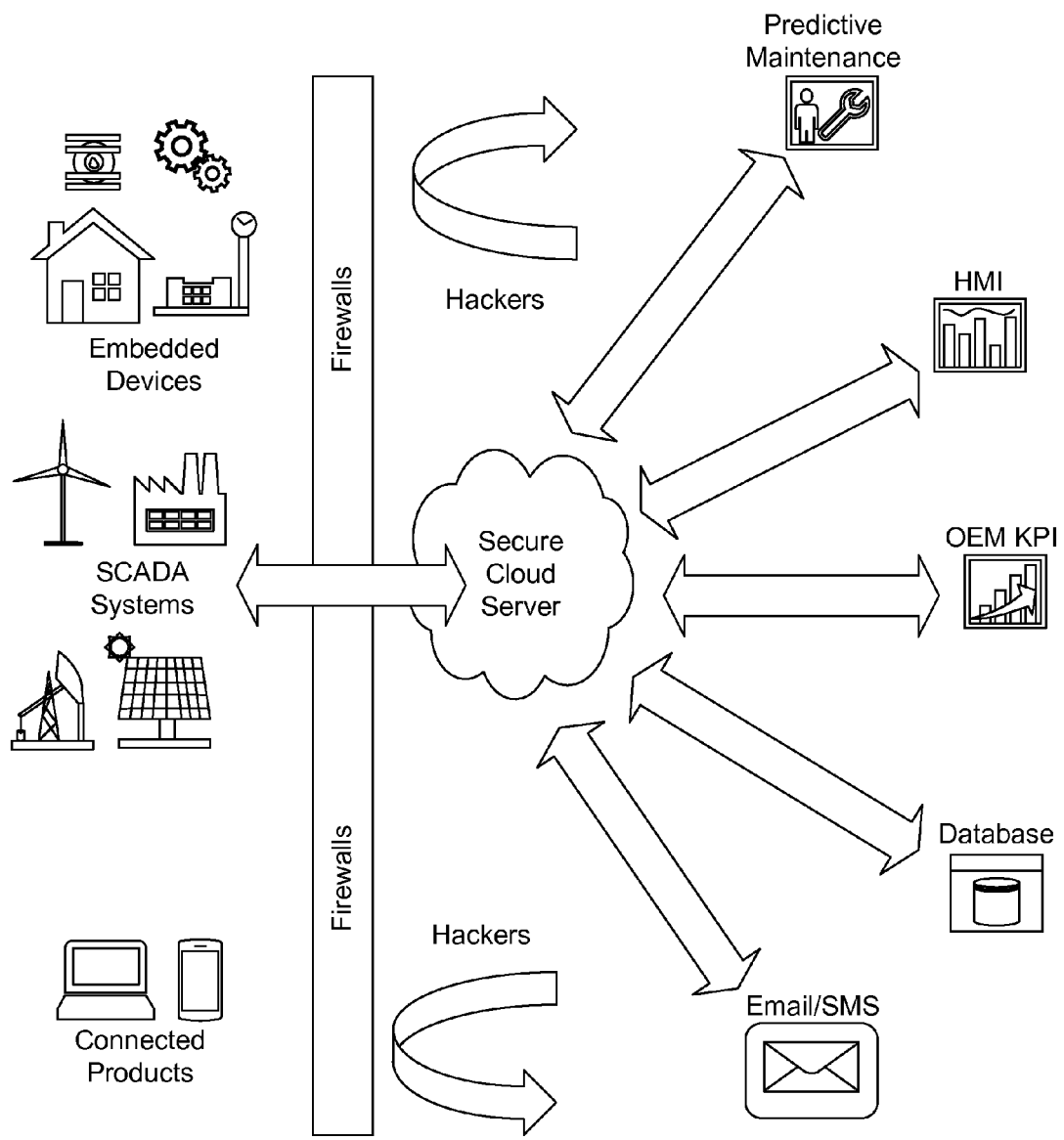
FIG. 12 is an exemplary block diagram illustrating a system implementation, in accordance with one embodiment of the invention.

Referring to FIG. 12, in another embodiment, a system is shown that is similar to that shown in FIG. 11, but in a more visually descriptive manner. In particular, exemplary types of servers may comprise embedded devices, SCADA systems or various connected consumer products, all producing, propagating, sending and/or receiving data (some in real time, some not). As illustrated in FIG. 12, these devices are behind firewalls without open incoming firewall ports, thereby eliminating direct attacks from would-be hackers on the public network (not shown). On the same public network, a secure cloud server may receive outbound connections initiated by the device behind the firewalls, as illustrated symbolically by the large arrow across the firewall to the cloud server. Within the large arrow, data may be sent safely back to the devices.

Also shown in FIG. 12 is another aspect of the present invention, whereby the cloud server may employ methods described above to send data to RIAs for predictive maintenance or HMI displays, for data analysis (e.g. generating key performance indices), or to databases, or to provide alerts (e.g. via email or SMS).

In another embodiment (not shown), a firewall is not provided in front of the servers, clients or devices on the network, where the servers/clients/devices are configured to reject inbound connection requests. This is to be contrasted with employing firewalls that ignore inbound connection requests to the server/client/device behind the firewalls. In this embodiment, the operating system of the server/client/device responds to inbound connection requests, after a fashion, with a 'nobody is listening' response. While this configuration may be less secure than employing firewalls, there are situations where the server/client/device is resource constrained to the point where it is not possible to include a firewall. Surprisingly, the present invention thus provides a method to provide a more secure method of communication with resource-constrained devices.

It should be understood that when referring to a network residing between, for instance, a server and a client, the network itself may comprise a series of network connections; that is, there is no implication of a direct connection. Similarly, any server, client or device 'on' the Internet is understood to mean that the server, client or device is connected to a network connection that is accessible to the Internet.

It is also understood that an authority on a data set, or an authoritative holder of a data set, refers to the originator of the data set, and all other recipients of the data set hold non-authoritative copies. In the present invention, a server, client or device can inherit authority from another server, client or device; for example, the cloud server may act as an authority on a data set for another client/end-user device; the client/end-user device sees the cloud server as the authority on the data set, but unknown to the client/end-user device, the cloud server may be propagating the data from a "true" authoritative client/end-user device connected to the cloud server. It is appreciated that the present invention allows for a myriad of combinations of servers, clients, and devices interconnected and inheriting authority over multiple data sets shared among them.

What is claimed is:

1. A method of providing a secure network connection, the method comprising:
  listening at a server for inbound connection requests to the server on a network between the server and a client;
  receiving at the server a first inbound connection request from the client;
  establishing from the first inbound connection request a first network connection between the server and the client;
  receiving at the server a first data set from the client over the first network connection, wherein the client is the authoritative source of the first data set and is inaccessible via inbound connection requests;
  receiving at the server a second inbound connection request from a second client on the network;
  establishing from the second inbound connection request a second network connection between the server and the second client;
  propagating the first data set from the server to the second client over the second network connection, wherein the server is the authoritative source of the first data set with respect to the second client;
  receiving at the server a first data subset from the second client, the first data subset being a modification to a subset of the first data set generated by the second client; and
  propagating the first data subset from the server to the client.

2. The method of claim 1, further comprising:
  receiving at the server a second data set from the second client, wherein the end-user device is the authoritative source of the second data set.

3. The method of claim 1, further comprising:
propagating via the server the first data set from the second client to the client over the first and second network connections.

4. The method of claim 1, wherein the second client is inaccessible via inbound connection requests.

5. The method of claim 1, wherein the second client acts as a second server and the authoritative source of the first data set with respect to one or more secondary end-user devices on the network.

6. The method of claim 2, wherein the second client acts as a second server and the authoritative source of the second data set with respect to one or more secondary end-user devices on the network.

7. The method of claim 1, wherein the second client acts as a data server for (i) the client, (ii) or one or more secondary end-user devices on the network, or a combination of (i) and (ii).

8. The method of claim 1, wherein the second client is simultaneously an authoritative source of data for the client or one or more secondary end-user devices on the network and a non-authoritative server for the client or one or more secondary end-user devices on the network.

9. A system for providing a secure data network, the system comprising:
a server communicatively coupled to a network between the server and a client, the server operable to:
listen for inbound connection requests,
establish a first data connection between the server and the client based on a first inbound connection request received by the server,
receive a first data set from the client over the first data connection, wherein the first data set is produced by an authoritative source,
receive a second inbound connection request sent from a second client,
establish a second data connection between the server and the second client, wherein the data set is propagated from the server to the second client over the second data connection, and wherein the server is authoritative for the data set for the second client,
receive a first data subset sent from the second client, and propagate the first data subset to the client; and
wherein the client is inaccessible via inbound connection requests and the client is the authoritative source.

10. The system of claim 9, wherein the server is further operable to:
receive a second data set from the second client, wherein the second client is the authoritative source of the second data set.

11. The system of claim 9, where the server is further operable to:
propagate the first data set from the second client to the client over the first and second network connections.

12. The system of claim 9, wherein the second client is inaccessible via inbound connection requests.

13. The system of claim 9, wherein the second client acts as a second server and the authoritative source of the first data set with respect to one or more secondary end-user devices on the network.

14. The system of claim 10, wherein the second client acts as a second server and the authoritative source of the second data set with respect to one or more secondary end-user devices on the network.

15. The system of claim 9, wherein the second client acts as a data server for the client or one or more secondary end-user devices on the network.

16. The system of claim 9, wherein the second client is simultaneously an authoritative source of data for the client or one or more secondary end-user devices on the network and a non-authoritative server for the client or one or more secondary end-user devices on the network.

\* \* \* \* \*